US011539640B2

(12) United States Patent
Zhao et al.

(10) Patent No.: US 11,539,640 B2
(45) Date of Patent: Dec. 27, 2022

(54) TARGET RESOURCE OPERATION METHOD, NODE DEVICE, TERMINAL DEVICE AND COMPUTER-READABLE STORAGE MEDIUM

(71) Applicant: Beijing BOE Technology Development Co., Ltd., Beijing (CN)

(72) Inventors: Junjie Zhao, Beijing (CN); Qian Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 174 days.

(21) Appl. No.: 16/766,560

(22) PCT Filed: Nov. 20, 2018

(86) PCT No.: PCT/CN2018/116453
§ 371 (c)(1),
(2) Date: Jul. 2, 2020

(87) PCT Pub. No.: WO2019/101071
PCT Pub. Date: May 31, 2019

(65) Prior Publication Data
US 2020/0389415 A1 Dec. 10, 2020

(30) Foreign Application Priority Data

Nov. 22, 2017 (CN) .......................... 201711176350.3
Apr. 20, 2018 (CN) .......................... 201810360225.6

(51) Int. Cl.
*H04L 47/70* (2022.01)
*G16Y 30/00* (2020.01)

(52) U.S. Cl.
CPC .............. *H04L 47/82* (2013.01); *G16Y 30/00* (2020.01)

(58) Field of Classification Search
CPC ....................................................... H04L 47/82
See application file for complete search history.

(56) References Cited

U.S. PATENT DOCUMENTS 10,616,048 B2 * 4/2020 Bhalla ................ H04L 41/0803
2009/0235244 A1   9/2009 Enomori et al.
(Continued)

FOREIGN PATENT DOCUMENTS

CN    101534202 A    9/2009
CN    104955153 A    9/2015
(Continued)

OTHER PUBLICATIONS

International Search Report and Written Opinion from International Application No. PCT/CN2018/116453 dated Feb. 19, 2019.
(Continued)

*Primary Examiner* — S M A Rahman
(74) *Attorney, Agent, or Firm* — Dilworth & Barrese, LLP.; Michael J. Musella, Esq.

(57) ABSTRACT

A target resource operation method, a node device, a terminal device and a computer-readable storage medium. The method includes: receiving a request to carry out an operation by using a first resource as a target resource; determining at least one resource associated with the first resource; and selecting a target resource from among the at least one resource associated with the first resource to carry out the operation. According to the described method and device, an associated resource may be selected as a target resource for carrying out an operation according to the relevance of each resource.

20 Claims, 20 Drawing Sheets

(56) References Cited

U.S. PATENT DOCUMENTS

| | | | |
|---|---|---|---|
| 2014/0064232 A1 | 3/2014 | Chang et al. | |
| 2016/0014674 A1* | 1/2016 | Ahn | H04W 4/70 |
| | | | 455/456.1 |
| 2016/0112981 A1* | 4/2016 | Ahn | H04W 4/02 |
| | | | 455/500 |
| 2017/0257726 A1* | 9/2017 | Jeong | H04W 4/70 |
| 2018/0103337 A1* | 4/2018 | Di Girolamo | H04W 8/08 |

FOREIGN PATENT DOCUMENTS

| | | | |
|---|---|---|---|
| CN | 105338039 A | * | 2/2016 |
| CN | 105338039 A | | 2/2016 |
| CN | 103312667 B | | 9/2016 |
| CN | 106231538 A | | 12/2016 |

OTHER PUBLICATIONS

Second Chinese Office Action from Chinese Patent Application No. 201810360225.6 dated Nov. 29, 2021.

* cited by examiner

TARGET RESOURCE OPERATION METHOD, NODE DEVICE, TERMINAL DEVICE AND COMPUTER-READABLE STORAGE MEDIUM

CROSS-REFERENCE TO RELATED APPLICATIONS

This application claims priority to Chinese patent application No. 201711176350.3 filed on Nov. 22, 2017 and Chinese patent application No. 201810360225.6 filed on Apr. 20, 2018, the disclosure of which are incorporated herein by reference in their entirety as a part of this application.

TECHNICAL FIELD

The disclosure is related to Internet of Things, in particular, to a method for operating target resource, a node device, a terminal apparatus and a computer storage medium.

BACKGROUND

With the rapid development of Internet of Things technology in various application fields, more and more devices access to the Internet of Things. There may be exchanges of information and data between various devices, therefore, one device can be used to acquire the state of another device or one device can be used to perform operation on another device, to meet the requirements of building a system of Internet of Things.

SUMMARY

According to an aspect of the present disclosure, there is provided a method for operating a target resource, comprising: receiving a request for operating a first resource as the target resource; retrieving at least one resource associated with the first resource; and selecting the target resource from the at least one resource associated with the first resource for operation.

According to another aspect of the present disclosure, there is provided a node device comprising a processor, wherein the processor is configured to perform the above-described method for operating a target resource.

According to yet another aspect of the present disclosure, there is provided a method for operating a target resource, comprising: transmitting a request for operating a first resource as the target resource; and receiving a response result of operating at least one resource associated with the first resource.

According to another aspect of the present disclosure, there is provided a terminal apparatus in which a processor is configured to perform the above-described method for operating a target resource.

According to yet another aspect of the present disclosure, there is provided a computer readable storage medium having stored thereon computer program instructions that, when executed by a processor, cause the processor to implement the steps of the above-described method for operating a target resource.

BRIEF DESCRIPTION OF THE DRAWINGS

In order to more clearly describe embodiments of the present disclosure or technical solutions known by the inventor, drawings needed in the description of the embodiments will be briefly introduced in the following. Obviously, the drawings in the following description are only some embodiments of the present disclosure, and are not the limitation of the present disclosure. For those skilled in the art, other drawings can be obtained according to these drawings without inventive labor.

DETAILED DESCRIPTION OF THE EMBODIMENTS

In order to make the purposes, technical solutions and advantages of the present disclosure more clear, the following examples will further explain the present disclosure in detail. Obviously, the described embodiments are only some embodiments of the present disclosure, not all embodiments. Based on the embodiments in the present disclosure, all other embodiments obtained by those of ordinary skill in the art without inventive labor are within the protection scope of the present disclosure.

Figure 1:
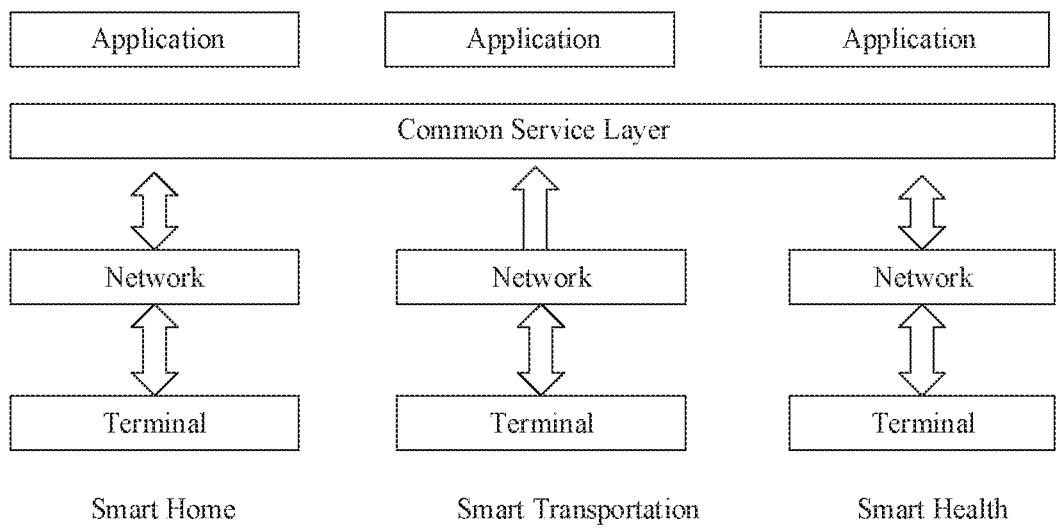
FIG. 1 schematically illustrates an exemplary application architecture of the Internet of Things.

With the development of information technology, especially Internet technology, the Internet of Things technology for realizing informatization, remote management control and intelligent networks is gradually growing up. The Internet of Things utilizes communication technologies such as a local network or Internet to connect sensors, controllers, machines, people, and things together in new ways in order to form a correlation between people and things, or, a correlation between things. The Internet of Things is an extension of the Internet and includes the Internet and all resources on the Internet, which offers compatibility to all applications on the Internet. With the application of Internet of Things technology in various fields, various new application fields have emerged, such as smart home, smart transportation, smart health, etc. As shown in FIG. 1, various terminal apparatuses access to a network and access to a general service layer through the network, and the general service layer supports various applications, thus forming a "terminal+network+application" architecture. For example, in the field of smart home, various home appliances can utilize a local area network (LAN) to access a public service platform, for example, in a wireless or wired manner. Optionally, the local area network may be a personal area network (PAN), for example, taking a wireless personal area network (WPAN) as an example, various technologies such as Bluetooth, IrDA, Home RF, ZigBee, or UWB (Ultra-Wideband Radio) may be adopted to realize the access.

Taking an oneM2M protocol architecture as an example, manageable entities may be M2M devices, M2M gateways, or devices in M2M domain networks, or M2M application layers or software components of M2M service layers. Among them, all entities in the oneM2M system, such as an application entity AE, a common service entity CSE, data, etc., are represented as resources. Under the oneM2M architecture, resources are uniquely addressable and a resource structure is specified to represent such resources. A resource may contain one or more sub-resources and one or more attributes, wherein the attributes store information belonging to the resource. When an Internet of Things entity, such as a software module in a terminal apparatus or a node device of Internet of Things, transmits data or information to a common service entity, thereafter the data or information is stored as a separate resource. In addition, the Internet of Things entity may transmit a request to the common service entity to update a resource corresponding to the Internet of Things entity stored on the common service entity, so as to reflect a state of the device operated by the Internet of Things entity. This update can be real-time or periodic, or can be triggered by a certain condition. For example, the update can be performed when a value of the state reaches a certain threshold, or when another entity requests to acquire the state of the Internet of Things entity. Therefore, other Internet of Things entities communicating with the common service entity can acquire the state of the device corresponding to the Internet of Things entity by accessing the updated resource. Optionally, other Internet of Things entities communicating with the common service entity may operate on the updated resource. It should be noted that resources referred to herein include resources of various entities, which are embodied as, for example, software modules in Internet of Things devices, such as entities such as AE, CSE, etc. An entity may represent a software module of a communication device (such as the aforementioned software module in the terminal apparatus or node device of Internet of Things). The common service entity may represent a software module of a service platform, and the service platform may be local or remote. Optionally, the operation on the updated resource includes, for example, acquiring information on the updated resource, deleting the information on the updated resource, notifying the information on the updated resource to the requester operating the target resource, or operating other resources based on the information on the updated resource.

As described above, in the present disclosure, the described entities, such as the application entity AE, the common service entity CSE, data, etc., can be represented through resources. A resource may have a unique identifier, and the resource includes attributes and sub-resources, wherein the attributes are used to store information related to the resource, the sub-resources are in a level lower than that of the resource, and the resource includes an index directing to the sub-resources.

Figure 2:
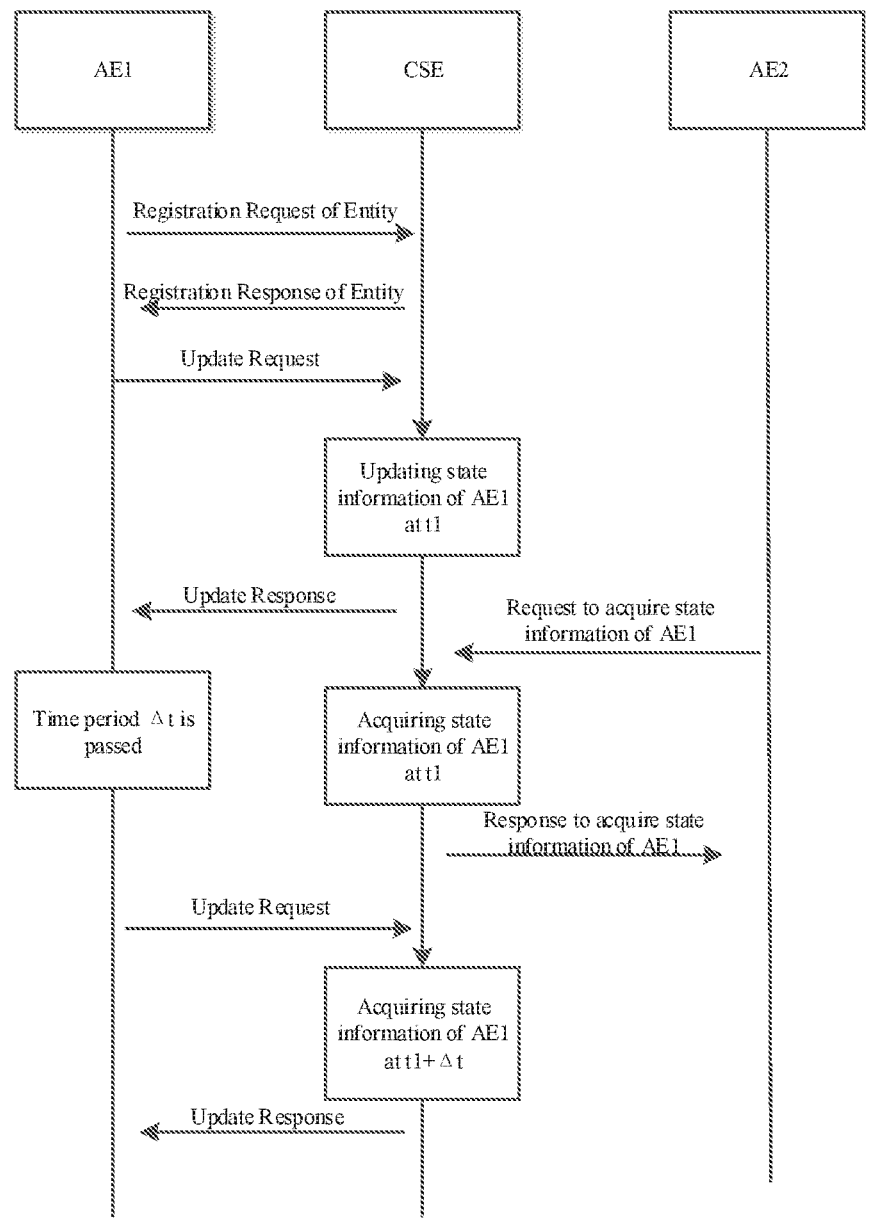
FIG. 2 schematically illustrates a known process for acquiring state information of a device.

FIG. 2 shows a situation. For example, an application entity AE1 is registered at the common service entity CSE, thereby creating a corresponding resource <CSEBase>/<AE1> for the entity AE1 on the common service entity CSE. The AE1 may initiate an update request for the resource to the common service entity, thereby reporting information and data about the state of the device corresponding to the AE1 to the CSE, thus through the update request "Update Request", the state of the device at the time of the update can be reflected in time under the resource of the common service entity CSE. Then, a request may be transmitted by another entity AE2 to the common service entity to acquire the resource corresponding to the AE1, thereby acquiring the state of the device corresponding to the AE1. For example, the AE1 periodically transmits the update request to the CSE. If the period of transmitting the update request is very long, it means that the speed for updating the resource corresponding to the AE1 under the CSE is slow, and the state of the device corresponding to the AE1 cannot be reflected in time. On the contrary, if the period of transmitting the update request is very short, it means that the speed for updating the resource corresponding to the AE1 under the CSE is fast, and the state of the device corresponding to the AE1 can be reflected in time. However, this will cause the power consumption of the device running the AE1 to increase, especially when the device is a mobile device powered by a battery, and the endurance time of the device will be shortened.

According to an embodiment of the present disclosure, a method for acquiring a detected parameter state by utilizing a correlation between resources of entities is provided. Optionally, the parameter state may be a state of a detected device or a state of a detected physiological parameter of a user. In the following, the principle of the embodiments will be explained in detail by taking a situation of an electric vehicle being charged with a charging pile as an example.

Figure 3:
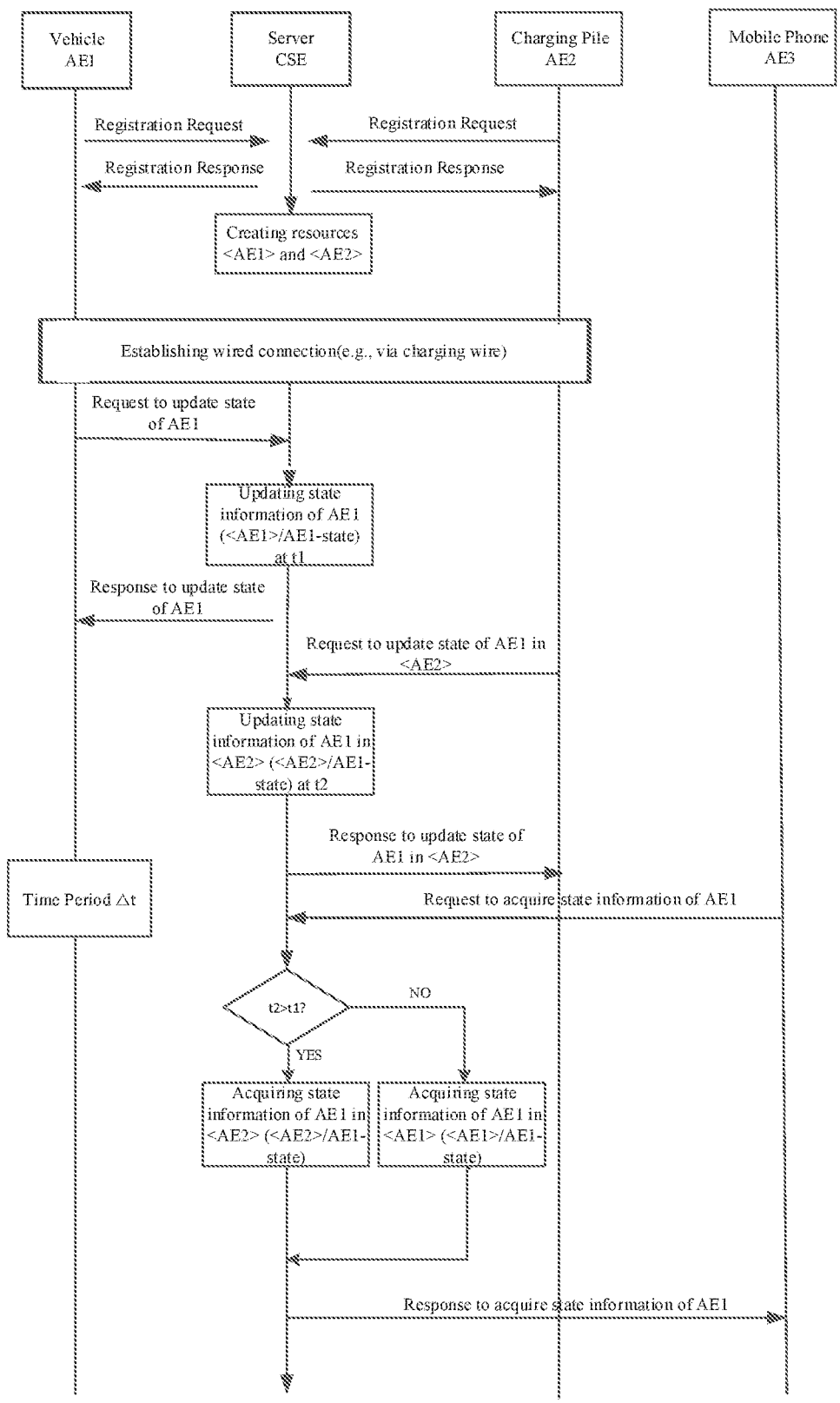
FIG. 3 schematically illustrates a process for acquiring a target resource according to an embodiment of the present disclosure.

As shown in FIG. 3, a charging program module running on the electric vehicle can be taken as a first application entity AE1, a charging program module running on the charging pile can be taken as a second application entity AE2, and a charging management program module running on a server respectively connected with the electric vehicle and the charging pile can be taken as a common service entity CSE. Optionally, the server may be local or remote, the communication connection between the electric vehicle and the server may be wired or wireless, and the communication connection between the charging pile and the server may also be wired or wireless. Optionally, the first application entity AE1 may transmit a charging state information about the electric vehicle to the charging management program module as the common service entity CSE, for storage as the first resource. For example, the first application entity AE1 transmits a registration request such as Request(Create<AE>) to the CSE, and after the CSE passes an identity check for the AE1 the CSE creates a corresponding resource <CSEbase>/<AE> for the AE1 as the first resource, and then transmits information about the created resource to the first application entity AE1 as a response, such as Response (Create<AE>AE-ID='xxx').

Similarly, the second application entity AE2 may also register at the CSE, and the CSE creates a corresponding resource <AE2> for the second application entity AE2 as the second resource according to a request of the second application entity AE2. The specific process is similar and will not be repeated here.

When the electric vehicle and the charging pile are connected through cables, a communication connection can be established between them, and a correlation can be established between the first resource <AE1> and the second resource <AE2>. This correlation may be implemented in an indirect manner by creating a resource group and correlating the first resource and the second resource as members of the resource group or in a direct manner by correlating them by directing an attribute of the first resource to the identifier of the second resource.

Figure 4A:
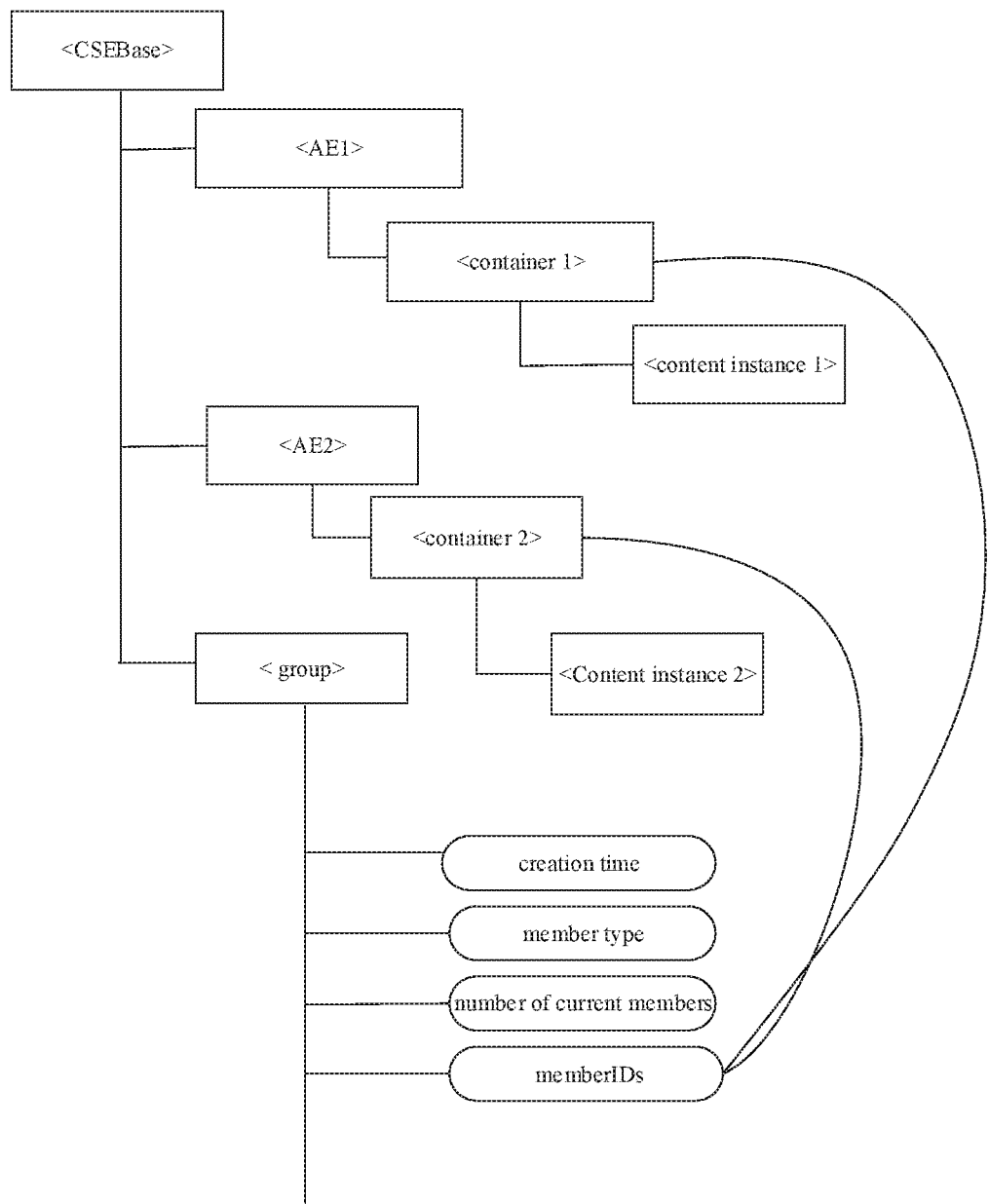
FIGS. 4A-4B schematically illustrate a structure for correlating resources.

For example, in a case of correlating the first resource <AE1> with the second resource <AE2> in the manner of creating a resource group, a request to create a resource group can be transmitted to the CSE by the first application entity AE1 or the second application entity AE2, thus a resource group <group> can be created on the common service entity the CSE, as shown in FIG. 4A, and an attribute "memberIDs" (i.e., member IDs) of the <group> (a list representing identifiers of resources of members of the <group>) is directed to the first resource <AE> and the second resource <AE2>, such as <container1> of the first resource <AE1> (i.e., <container 1>) and <container2> of the second resource <AE2> (i.e., <container 2>). In other words, the first resource <AE1> and the second resource <AE2> are correlated through the created resource group <group>. It should be noted that FIG. 4A only schematically lists several attributes under the resource <group>, such as member type, creation time current number of members, list of member IDs, etc., but in fact, as required, the resource <group> may also include other attributes such as maximum number of members, consistency policy, etc., and other sub-resources such as <fan-out point>, which are not described here.

Figure 4B:
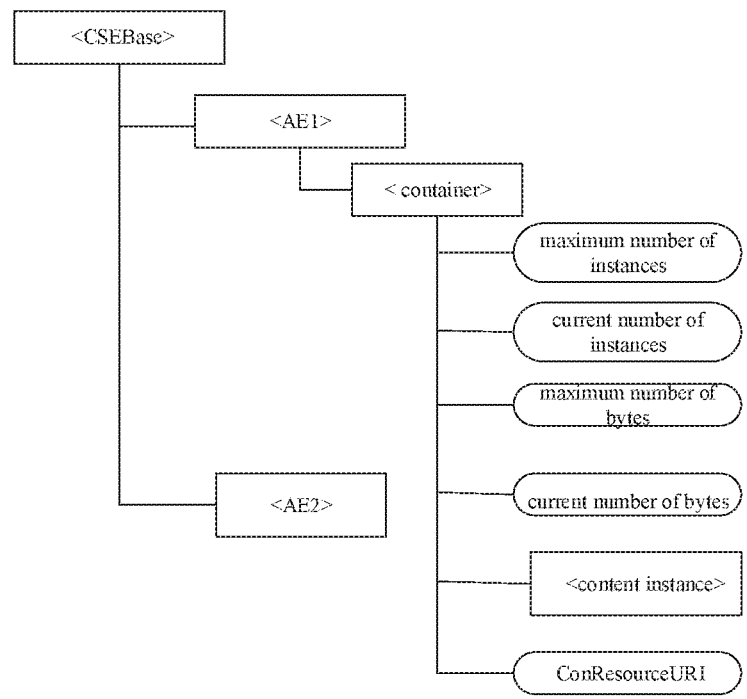

Optionally, the first resource <AE1> and the second resource <AE2> can also be correlated through resource attributes of an entity. For example, as shown in FIG. 4B, an attribute of correlated resource URI (i.e., conResouceURI) may be added under the first resource <AE1> and set to direct to the identifier of the <AE2>, thereby correlating the second resource <AE2> with the first resource <AE1>. Specifically, the first application entity AE1 may transmit an update request to the common service entity CSE, thereby directing the attribute "conResourceURI" under the first resource <AE1> to the second resource <AE2>. It should be noted that FIG. 4B only schematically lists several sub-resources and attributes under the resource <AE1>, for example, sub-resource <container> and sub-resource <content instance> under it, and related attributes: maximum number of instances, current number of instances, maximum number of bytes, and current number of bytes, but in fact, as required, the resource <AE1> may also include other attributes, which will not be described here.

Optionally, the first resource <AE1> and the second resource <AE2> can be correlated in the above manners during the process of establishing the communication connection between the first application entity AE1 and the second application entity AE2.

As an example, the first application entity AE1 periodically transmits an update request to the CSE to update a certain state of a device corresponding to the first resource <CSEBase>/<AE1> stored on the CSE, for example, to update the attribute <AE>/AE1-state created under the first resource <AE1>. In this embodiment, for example, the AE1 reports a charging state of the electric vehicle, e.g., a charging degree of a power battery (e.g., charging voltage, charging current, temperature, electric quantity (SOC), and other parameters of the power battery) to the CSE at a period of 10 s, thereby updating the resource <AE1> corresponding to the first application entity AE1. For example, the charging current of the power battery can be reported to the CSE as the state "AE1-state" of the resource <AE> under the CSE, and the state "AE1-state" of the resource <AE1> is periodically updated.

In addition, the second application entity AE2 corresponding to the charging pile may transmit, to the CSE, at a period of 4 ms, various parameter states (such as charging voltage, charging current, estimated charging time, etc.) of the charging pile during the process for charging the electric vehicle, thereby updating parameter values recorded on the second resource <CSEBase>/<AE2> on the CSE. As an example, the second application entity AE2, for example, reports, to the CSE, the charging current of the charging pile to charge the electric vehicle as the state "AE1-state" of the second resource <CSEbase>/<AE2> under the CSE, and the state "AE1-state" of the second resource <CSEbase>/<AE2> is updated at a period of 4 ms.

In the above example, the first resource <AE1> and the second resource <AE2> on the CSE respectively record the "AE1-state" reflecting the charging current of the battery, wherein the speed for updating <AE1>/AE1-state is less than the speed for updating <AE2>/AE1-state.

As a practical application scenario, a user may park the electric vehicle in the garage and use the charging pile to charge the electric vehicle, and then the user may go home to rest, and may use a charging management app installed on a mobile phone (which may be used as a third entity AE3 that initiates a request to operate the first resource <AE1> as the target resource) to access the common service entity CSE in order to know the charging state of the vehicle. Specifically, the third entity AE3 transmits a request to the CSE to acquire the charging state of the battery, for example, to acquire the charging current of the battery at present. When receiving from the AE3 a request for acquiring a resource, the CSE inquires the attribute "AE1-state" under its first resource <AE1> to acquire the latest update time t1 of the first resource <AE1> corresponding to the charging program module of the electric vehicle. In addition, the CSE also inquires the attribute "AE1-state" under its second resource <AE2> to acquire the latest update time t2 of the second resource <AE2> corresponding to the charging program module of the charging pile. The CSE compares t1 and t2, and if t2>t1 (i.e., the time represented by t1 is earlier than the time represented by t2), this indicates that the version of the data value stored in the second resource <AE2> is newer than the version of the data value stored in the first resource <AE1>. In order to provide the latest data to the user, the CSE inquires the attribute <AE2>/AE1-state under the second resource <AE2>, to acquire the value of the charging current reported by the charging program module of the charging pile, and transmits it to the third entity AE3 running on the user's mobile phone, thereby presenting the latest value of the charging current to the user as soon as possible. In this embodiment, by correlating the first resource <AE1> with the second resource <AE2> and also using the second resource <AE2> to record a certain state of the device corresponding to the first application entity AE1, the resource with a newer version is selected as the target resource by determining the updated states of the resources (the first resource <AE1> and the second resource <AE2>) registered at the CSE, so as to provide the latest information to the requester (such as the third entity AE3 in this embodiment) requesting to operate the target resource.

In the above embodiment, according to the update times of different correlated resources <AE1> and <AE2> on the CSE, the resource whose update time is closer to current time is selected as the target resource, thereby improving the timeliness of resource processing and reflecting the latest information about the resource.

Optionally, on the basis of the update times, it is also possible to decide which resource is selected as the target resource in conjunction with the data recorded by the first resource <AE1> and the second resource <AE2>, and provide information to the requester initiating the request to operate the target resource. For example, if it is determined that t1>t2, but the difference between t1 and t2 is less than or equal to a certain threshold, for example, less than or equal to 2 s, this indicates that the update times of resources <AE1> and <AE2> on the CSE are relatively close, and the determination on which of them can be selected as the target resource to be operated can be made according to other factors. For example, in the above example, the update time of the data provided by the first application entity AE1 is later than the update time of the data provided by the second application entity AE2, but the update times of the both are relatively close. If the precision of the data value (e.g., the value of the charging current) reported by the second application entity AE2 corresponding to the charging program module of the charging pile is higher than the precision of the data value (e.g., the value of the charging current) reported by the first application entity AE1 corresponding to the charging program module of the electric vehicle, then the second resource <AE2> on the CSE is selected as the target resource, and its recorded data is provided to the third entity AE3 of the mobile phone, thereby improving the precision of the provided data without obviously affecting the real-time performance of the data.

In the above embodiment, the first application entity AE1 and the second application entity AE2 respectively report data and information by updating their corresponding resources (the first resource <AE1> and the second resource <AE2>) on the common service entity CSE, so that the common service entity CSE can select one of the first resource <AE1> and the second resource <AE2> as the target resource to operate.

Figure 5:
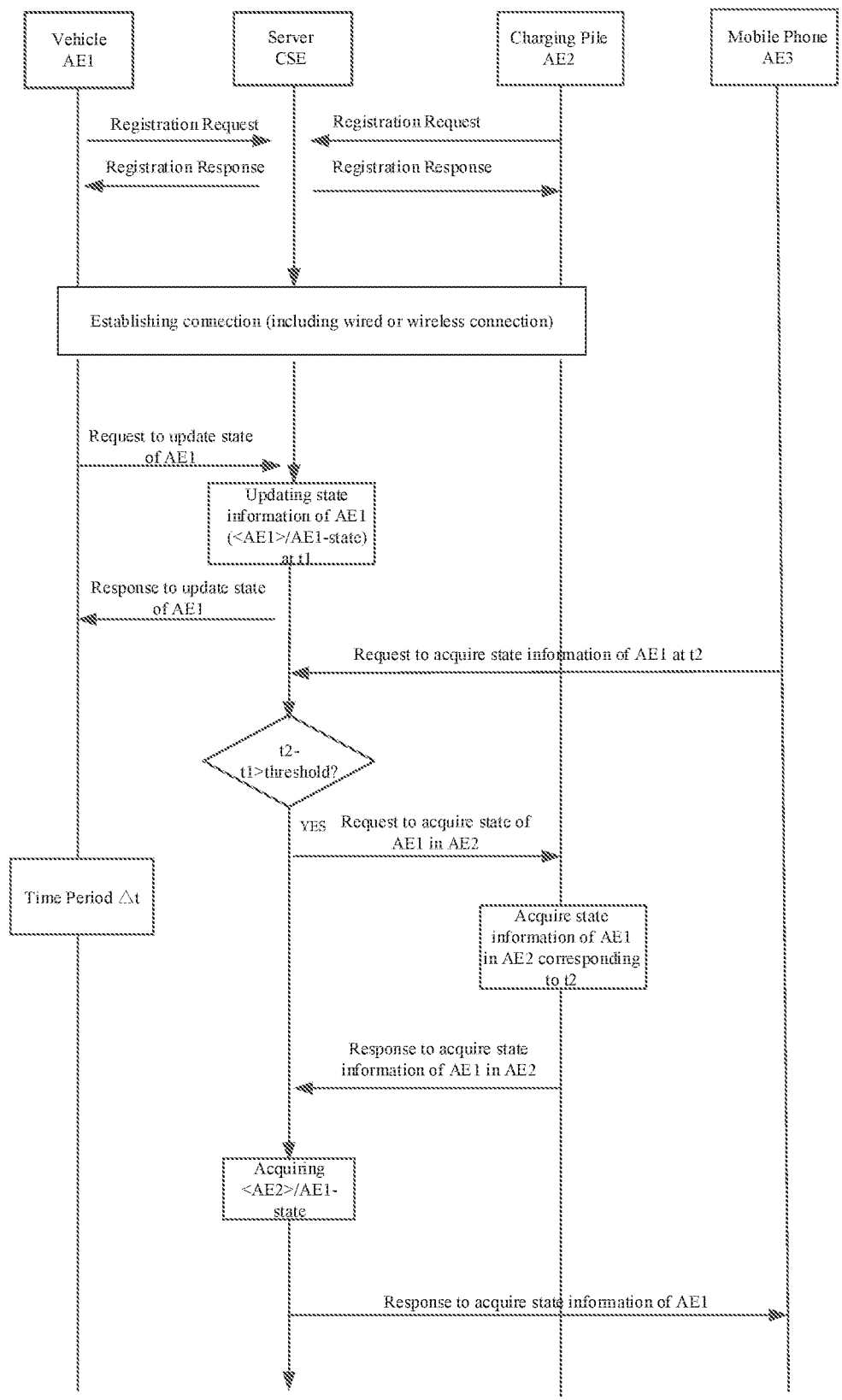
FIGS. 5-12 schematically illustrate a process for determining the target resource and performing an operation thereon according to an embodiment of the present disclosure.

FIG. 5 shows a modified embodiment of the present disclosure. In the embodiment described above with reference to FIG. 3, the first application entity AE1 corresponding to the charging program module of the electric vehicle and the second application entity AE2 corresponding to the charging program module of the charging pile periodically report data and information to the common service entity CSE respectively. However, in the embodiment described with reference to FIG. 5, only the first application entity AE1 corresponding to the charging program module of the electric vehicle periodically reports data and information to the common service entity CSE, while the second application entity AE2 corresponding to the charging program module of the charging pile does not actively report data and information to the common service entity, that is, the second application entity AE2 updates the corresponding second resource <AE2> on the CSE only when being triggered, for example, when receiving a request from the CSE. In this way, for example, network resources occupied by the second application entity AE2 to actively report data and information to the CSE can be reduced, and the utilization of network resources can be optimized. In addition, if the second application entity AE2 corresponds to an application of a mobile device, the power consumption of the mobile device can also be reduced.

As mentioned above, the charging management program module running on the server can serve as the common service entity CSE. Optionally, the server may be local or remote, the communication connection between the electric vehicle and the server may be wired or wireless, and the communication connection between the charging pile and the server may also be wired or wireless.

The following will be described in detail with reference to FIG. 5. Similar to the above description with reference to FIG. 3, the first application entity AE1 and the second application entity AE2 respectively transmit a registration request to the CSE, thus corresponding first resource <AE1> and second resource <AE2> are respectively created on the CSE. As an example, the first application entity AE1 and the second application entity AE2 communicate with each other when the charging pile starts to charge the electric vehicle. Similarly, the both can communicate with each other via wired or wireless connections.

Specifically, the first application entity AE1 transmits a registration request, such as Request (Create<AE>) to the CSE, and the CSE creates a corresponding first resource <CSEbase>/<AE1> for the first application entity AE1 after the CSE passes an identity check for the AE1 and then transmits information about the created resource to the first application entity AE1 as a response, such as Response (Create <AE>AE-ID='xxx').

Similarly, the second application entity AE2 can also register at the CSE, and the CSE creates a corresponding second resource <AE2> for the second application entity AE2 according to a request of the second application entity AE2. The specific process is similar and will not be repeated here.

When the electric vehicle and the charging pile are connected through cables, a communication connection can be created between them, and a correlation can be created between the first resource <AE1> and the second resource <AE2>. This correlation may be implemented in an indirect manner by creating a resource group and correlating the first resource and the second resource as members of the resource group or in a direct manner by correlating them by directing an attribute of the first resource to the identifier of the second resource. The establishment of the correlation is described in the description above with respect to FIGS. 4A-4B, which will not be repeated here.

As an example, the first resource <AE1> and the second <AE2> created on the CSE can respectively record parameters reflecting the charging state of the battery, for example, <AE1>/AE1-state and <AE2>/AE1-state.

In this embodiment, as shown in FIG. 5, as an example, the first application entity AE1 periodically transmits an update request to the CSE, to update a certain state of the device corresponding to the first resource <CSEBase>/<AE1> stored on the CSE, for example, to update the first resource <AE1>/AE1-state. In this embodiment, for example, the first application entity AE1 reports a charging state of the electric vehicle, e.g., a charging degree of a power battery (e.g., charging voltage, charging current, temperature, electric quantity (SOC), and other parameters of the power battery) to the CSE at a period of 10 s, thereby updating the first resource <CSEBase>/<AE1> corresponding to the first application entity AE1 under the CSE. For example, the charging current of the power battery can be reported to the CSE as the state "AE1-state" of the first resource <AE1> under the CSE, and the state "AE1-state" of the first resource <AE1> is periodically updated.

Different from the situation shown in FIG. 3, the second application entity AE2 corresponding to the charging pile does not actively transmit various parameter states of the charging pile, such as charging voltage, charging current, estimated charging time, etc., to the CSE during the process of charging the electric vehicle. In other words, AE2 does not actively report to update the parameter values recorded on the second resource <CSEBase>/<AE2> on the CSE. This method can reduce network resources occupied by periodically transmitting relevant data. In fact, although the second application entity AE2 does not actively report to update its corresponding second resource <CSEBase>/<AE2> on the CSE, due to its correlation with the AE1 (for example, in this embodiment, the second application entity AE2 corresponding to the charging program module of the charging pile and the first application entity AE1 corresponding to the charging program module of the electric vehicle both record the value of the charging current for charging the power battery of the vehicle), the second application entity AE2 itself will update the state value "AE1-state" in real time, except that the second application entity AE2 does not actively report to update the second resource <CSEBase>/<AE2> on the CSE.

In the application scenario described above in conjunction with FIG. 3, for example, the user may remotely monitor a charging situation of the electric vehicle at home using a charging management app installed on the mobile phone (the app may be taken as a third entity AE3 that initiates a request to operate the first resource <AE1> as the target resource). For example, the third entity AE3 can access the common service entity CSE to acquire the charging state of the electric vehicle. Specifically, as shown in FIG. 5, the third entity AE3 transmits a request to the CSE at time t2 to acquire the charging situation of the battery, for example, to acquire the charging current of the battery at present. When receiving from the AE3 the request for acquiring a resource, the CSE inquires the attribute "AE1-state" under its resource <CSEBase>/<AE1> to acquire the latest update time t1 of the first resource <AE1> corresponding to the charging program module AE1 of the electric vehicle, and determines a time difference between t2 and t1. If the CSE determines that the time difference between t2 and t1 is less than or equal to a certain time threshold, such as 9 s, the CSE considers that the updated version of the first resource <AE1> is relatively new, and can accept the data and information recorded therein. For this reason, the CSE acquires the attribute "AE-state" recorded under the first resource <AE1> and provides it to the third entity AE3 (e.g., a charging management app of the mobile phone in this embodiment) that has transmitted the request to operate the target resource. On the contrary, if the CSE determines that the time difference between t2 and t1 is greater than the certain time threshold, e.g. 9 s, the CSE considers that the updated version of the first resource <AE1> is relatively old and the recorded data and information is unacceptable. Therefore, as shown in FIG. 5, the CSE will take the second resource <AE2> as the target resource and transmit a request to the second application entity AE2 to actively acquire the "AE1-state" recorded by the second application entity AE2. In this embodiment, because the second application entity AE2 corresponding to the charging pile records the charging current in real time, the AE2 can provide the latest record of the charging current to the CSE when receiving the acquisition request from the CSE. Upon receiving a response from the AE2, the CSE can update <AE2>/AE-state, and can provide the value of the charging current at present to the AE3 on the user's mobile phone.

In this embodiment, firstly, the updated state of the first resource <AE1> registered on the CSE is determined. If the data corresponding to the updated state is acceptable, then the first resource <AE1> is selected as the target resource for operation, for example, the updated data of the first resource <AE1> is provided to the requester operating the target resource for processing. On the contrary, if the data corresponding to the update state cannot be accepted, then a request is transmitted by the CSE to the second application entity AE2 correlated with the first application entity AE1, the second resource <AE2> is taken as the target resource, and the data recorded by the second resource <AE2> is provided to the requester for processing.

In this way, network resources occupied by the second application entity AE2 to periodically transmit data to the CSE, especially in real time, can be reduced while keeping the real-time performance of the data as much as possible, and the power consumption of the device running the second application entity AE2 can be reduced, especially when the device running the second application entity AE2 belongs to a battery-powered mobile device.

Optionally, other characteristics of the updated data of the first resource <AE1> can also be considered to determine whether to take the second resource <AE2> as the target resource for operation. For example, in response to the request from the requester (the third entity AE3 of the mobile phone) to acquire the charging current of the vehicle, the CSE inquires the "AE1-state" of the first resource <AE1> to acquire data information (e.g. data value) about the charging current. Then, the CSE compares the data information about the charging current with a data precision requirement corresponding to charging time. In fact, as the charging time for charging the battery of the vehicle increases, the data value of the charging current will gradually decrease and the required data precision will increase. When the CSE acquires an updated data value of the relevant charging current of the first application entity AE1 by inquiring the "AE1-state" of the first resource <AE1>, the CSE compares the updated data value with the data precision requirement. If it is found that the data precision requirement is not met, the CSE selects the second resource <AE2> of the second application entity AE2 corresponding to the charging pile as the target resource, and transmits a request to acquire the "AE1-state" recorded by the second application entity AE2, thereby being able to provide data value with a higher precision to the third entity AE3 of the mobile phone as the requester.

According to this manner, based on different requirements, one of the first resource <AE1> and the second resource <AE2> which are correlated with each other can be selected as the target resource for processing, thus improving the flexibility and precision of data processing.

Figure 6:
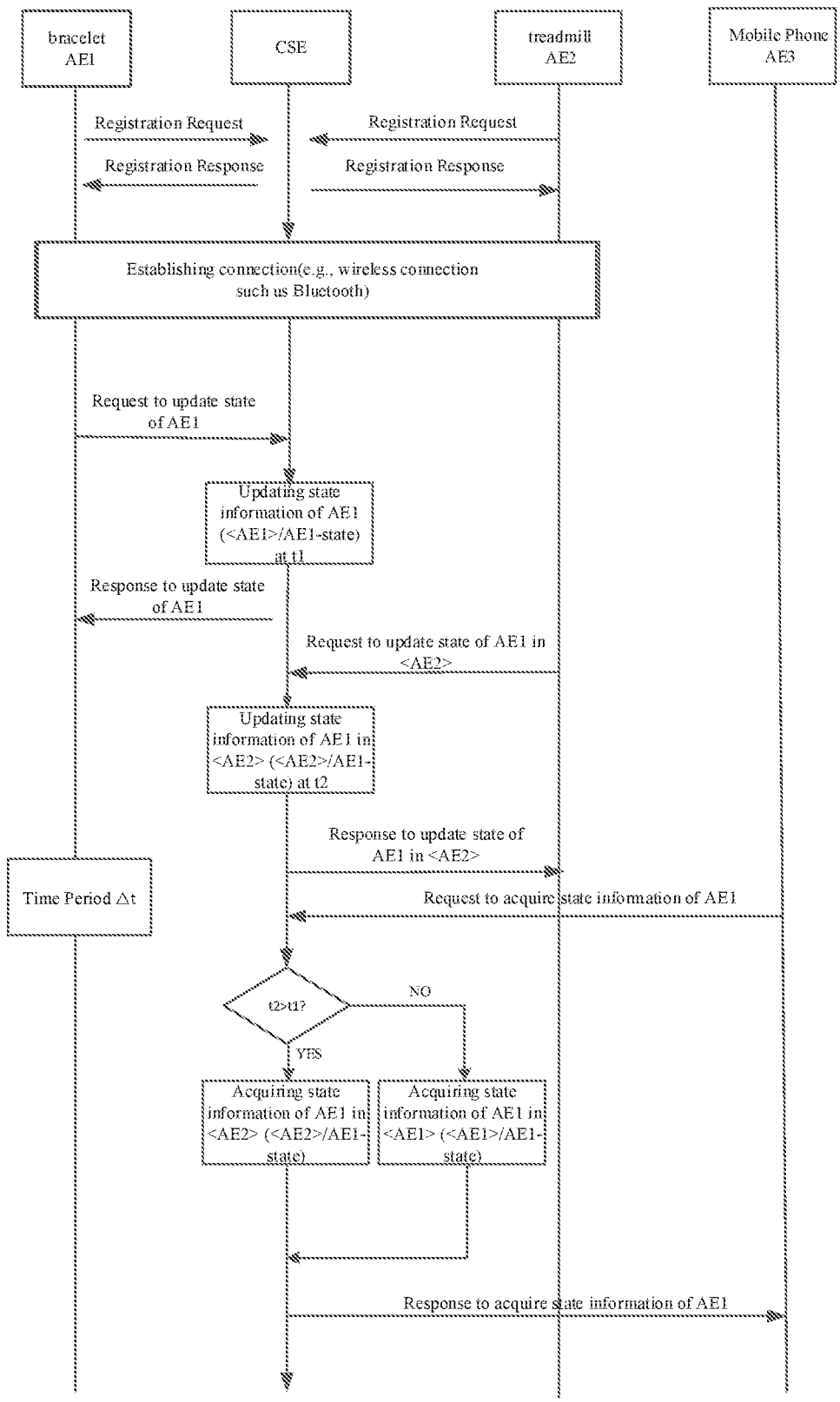

The principle of the present disclosure is further explained below in conjunction with yet another example. For example, when exercising with a treadmill in a public gym, a user can wear an intelligent bracelet to monitor physiological parameters such as heart rate, blood pressure and other related simple exercise parameters (for example, number of steps), while using the treadmill to record detailed exercise parameters, such as number of steps, speed, energy consumed, slope, and other parameters. For example, a software for monitoring physiological parameters of the user can be installed on the intelligent bracelet. As shown in FIG. 6, the software installed on the intelligent bracelet corresponds to the first application entity AE1, while the software installed on the treadmill to record the user's exercise parameters can be used as the second application entity AE2 shown in FIG. 6. When the user starts exercising, the intelligent bracelet and the treadmill establish a wireless personal area network (WPAN) through connection with each other. Before or after the establishment of the wireless personal area network, the first application entity AE1 of the intelligent bracelet and the second application entity AE2 of the treadmill respectively register with the common service entity CSE to create corresponding resources, for example, the first resource <AE1> and the second resource <AE2>. The common service entity may represent a software module on a common service platform that analyzes a user's health, and the common service entity CSE may be a service software installed on a remote server connected through a gateway/router in the gym, for example. After the WPAN is established, the first application entity AE1 of the intelligent bracelet can establish a wireless communication with the second application entity AE2 of the treadmill, for example, establish a wireless connection using Blue-tooth. As described above, a correlation can be established between the first resource <AE1> and the second resource <AE2>. Regarding the establishment of the correlation, please refer to the description above with respect to FIGS. 4A-4B, which will not be repeated here. In addition, when the user finishes the exercising, the correlation between the intelligent bracelet and the treadmill is released.

Optionally, the first application entity AE1 of the intelligent bracelet transmits an update request periodically (for example, at 10 s) to the CSE to update the corresponding first resource <AE1> on the CSE, so as to report the measured physiological parameters and simple exercise parameters of the user to the CSE. As a battery-powered mobile device, if the set update period is relatively small, it means that the speed for updating the first resource <AE1> corresponding to the first application entity AE1 on the CSE is fast, which can reflect the measured physiological parameters of the user in time. However, if the update period is too short, the power consumption for running the intelligent bracelet will increase and the endurance time of the intelligent bracelet will be shortened. On the contrary, if the update period is too long, the user's exercise state cannot be reflected in time, which is disadvantageous to the monitoring of the user's physiological parameters which may vary during the exercising For this reason, according to the embodiments of the present disclosure, the second application entity AE2 in the treadmill can be utilized to transmit an update request to the CSE in a short period, for example, 2 ms, to update the second resource <AE2> on the CSE. This is because the operation of the second application entity AE2 has little influence on the power consumption of the treadmill and the power consumption of the second application entity AE2 can be ignored.

When the user uses the treadmill for exercise, the exercise data of the user can also be collected through the app running on the user's mobile phone (which is taken as the requester initiating the request to operate the first resource <AE1> as the target resource, such as the third entity AE3 illustrated in FIG. 6). Considering the privacy of various data on the user's mobile phone, the third entity AE3 is not directly correlated with the second application entity AE2 of the treadmill in the public gym, but acquires the user's exercise data through the common service entity running on the server. For example, the third entity AE3 may transmit an acquisition request "Retrieve" to the common service entity CSE to acquire the data and information of the first resource <AE1> thereon, in this embodiment, that is, to acquire the data and information reported by the intelligent bracelet.

When receiving from the AE3 the request for acquiring a resource, the CSE inquires the attribute "AE1-state" under its first resource <AE1> to acquire the latest update time t1 of the first resource <AE1> corresponding to the first application entity AE1 corresponding to the intelligent bracelet. In addition, the CSE also inquires the attribute "AE1-state" under its second resource <AE2> to acquire the latest update time t2 of the second resource <AE2> corresponding to the second application entity AE2 corresponding to the treadmill. The CSE compares t1 and t2, and if t2>t1 (i.e., the time represented by t1 is earlier than the time represented by t2), this indicates that the version of the data value stored in the second resource <AE2> is newer than the version of the data value stored in the first resource <AE1>. In order to provide the latest data to the user, the CSE inquires the "AE1-state" of the second resource <AE2> (<AE2>/AE1-state) to acquire, for example, the user's exercise parameters reported by the treadmill, such as the number of steps, and transmits it to the AE3 running on the user's mobile phone, thereby presenting the latest number of steps to the user as much as possible. In this embodiment, by correlating the first resource <AE1> with the second resource <AE2>, and also using the second resource <AE2> to record a certain state of the device corresponding to the first application entity AE1, such as the number of steps of the user, the resource with a newer version is selected as the target resource by determining the updated states of the first resource <AE1> and the second resource <AE2> registered at the CSE, to provide the latest information to the requester, such as the AE3 of the mobile phone.

In the above embodiment, according to the update times of different correlated resources <AE1> and <AE2> on the CSE, the resource whose update time is closer to current time is selected as the target resource, thereby improving the timeliness of resource processing and reflecting the latest information about the resource.

Alternatively, on the basis of the update times, it is also possible to decide which resource is selected as the target resource in conjunction with the data recorded by the first resource <AE1> and the second resource <AE2>, and provide information to the requester. For example, if it is determined that t1<t2, it indicates that the data reported by the treadmill is updated later than the data reported by the intelligent bracelet, but if the difference between t1 and t2 is less than or equal to a certain threshold, for example, less than or equal to 2 s, it indicates that the update times of the first resource <AE1> and the second resource <AE2> on the CSE are relatively close, and the determination on which of them can be selected as the target resource to be operated can be made according to other factors. For example, in the above example, the update time of the data provided by the first application entity AE1 is earlier than the update time of the data provided by the second application entity AE2, but the update times of the both are relatively close. If the precision of the data value (e.g., the user's heart rate) reported by the second application entity AE2 corresponding to the program module of the treadmill is lower than the precision of the data value (e.g., the user's heart rate) reported by the first application entity AE1 corresponding to the program module of the intelligent bracelet, then the first resource <AE1> on the CSE is still selected as the target resource, and its recorded data is provided to the AE3 of the mobile phone, thereby improving the precision of the provided data without obviously affecting the real-time performance of the data.

In the above embodiment, the AE1 and the AE2 respectively report data and information by updating their corresponding resources <AE1> and <AE2> on the common service entity CSE, so that the common service entity CSE can select one of the first resource <AE1> and the second resource <AE2> as the target resource to operatez.

Similarly, according to a variation, in the above example, the policy of selecting the target resource shown above with reference to FIG. 5 may also be adopted. That is, the second application entity AE2 corresponding to the treadmill does not actively report data to the CSE, but the CSE transmits an acquisition request to the second application entity AE2 as needed, thus the second resource <AE2> on the CSE is updated. The specific details can be referred to the method described above with respect to FIG. 5 and will not be repeated here.

The implementations of the principle of the present disclosure have been schematically described above in conjunction with various examples of wired and wireless communication modes. However, it should be understood that the principle of the present disclosure is not limited to the specific examples described above, but may be applied to other situations.

It is described above in conjunction with FIGS. 4A-4B and FIG. 6 that, according to update situations of the data, one of the resources <AE1> and <AE2> on the CSE can be selected as the target resource, and the updated data of the target resource can be acquired and provided to the requester. Specifically, in the above example, for the request of acquiring the resource from the third entity AE3 as the requester, the common service entity CSE triggers the selection of which of the correlated first resource <AE1> and second resource <AE2> being as the target resource by determining a certain condition, for example, determining the update times of resources or the precision of the updated data of resources, thereby realizing the accuracy of the acquired data or information.

An example of triggering the common service entity to acquire a correlated resource as the target resource in another way will be described below with reference to FIG. 7. In this example, which resource is selected as the target resource to be operated is determined according to contents of the correlated resources.

Figure 7:
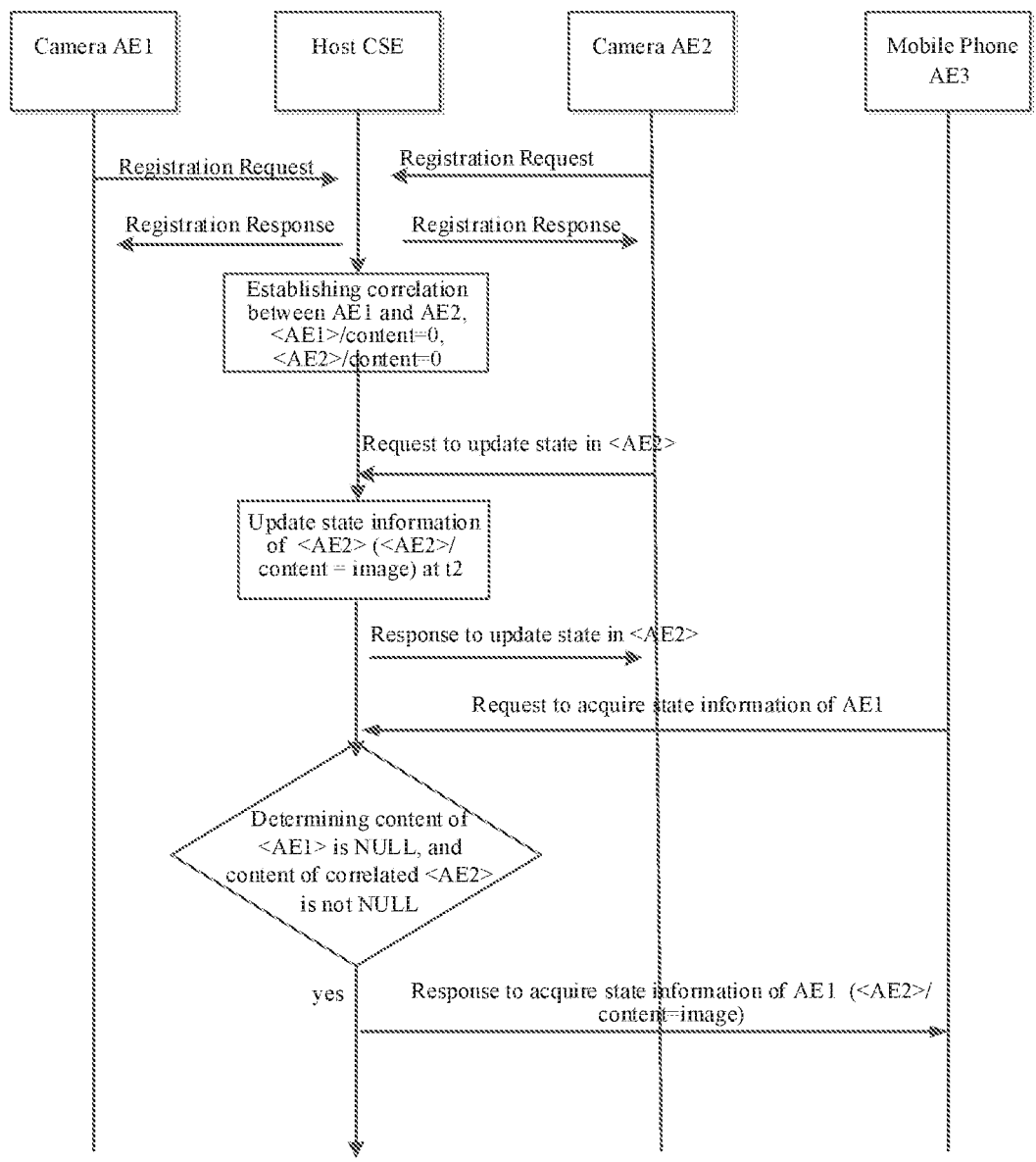

As shown in FIG. 7, for example, in an intelligent security system, for example, an intelligent camera A may be installed at an important position in a neighborhood, and an intelligent camera B may be installed at a non-important position. A security guard of the neighborhood is equipped with a mobile phone having a monitoring software installed thereon. The intelligent cameras A and B are wired or wirelessly connected with a server in the monitoring room of the neighborhood. Software programs capable of detecting the motion of an object are respectively run on the intelligent cameras A and B, which can be respectively taken as the first application entity AE1 and the second application entity AE2. The server runs a monitoring management program, which can be used as the common service entity CSE. The monitoring software running on the mobile phone of the security guard of the neighborhood can be used as the third application entity AE3 that initiates the request to operate the target resource. As shown in FIG. 7, the AE1 and AE2 are registered at the CSE respectively, thus resources, for example, a first resource <AE1> and a second resource <AE2> are created for the AE1 and AE2 on the CSE. In addition, there may be no direct physical connection between the cameras A and B, but a correlation (i.e., logical correlation) between the first resource <AE1> and the second resource <AE2> may be established in an indirect manner by creating a resource group and correlating the first resource and the second resource as members of the resource group or in a direct manner by correlating them by directing an attribute of the first resource to the identifier of the second resource. Regarding the establishment of the correlation, please refer to the description above with respect to FIGS. 4A-4B, which will not be repeated here.

For the intelligent camera in this example, when the first application entity AE1 running on the intelligent camera detects the presence of a moving object within the monitoring range of the intelligent camera, for example, when the presence of a moving vehicle or person is detected, the first application entity AE1 will control the camera to capture its image and upload the captured image to the corresponding first resource <AE1> on the CSE. For example, when the AE1 running on the camera A detects that there is a moving object within the monitoring range of the camera A, the AE1 will control the camera A to capture its image and upload the captured image to the first resource <AE1> on the CSE by transmitting an update request to the CSE, thereby updating the content of the first resource <AE1>. However, when no moving object is detected, the image will not be captured, nor will the content of the first resource <AE1> on the CSE be updated, leaving the content of the first resource <AE1> NULL. The same situation applies to the camera B.

When the security guard of the neighborhood patrols at night, the third application entity AE3 on the mobile phone periodically transmits a request to the CSE for acquiring the image of the camera A monitoring the important position. The CSE inquires the first resource <AE1> corresponding to the camera A. When it is found that the content in the corresponding first resource <AE1> is NULL, this indicates that there is no moving object within the monitoring range of the camera A. Because the first resource <AE1> is correlated with the second resource <AE2>, the CSE also inquires the second resource <AE2> corresponding to the camera B. When it is found that the content in the corresponding second resource <AE2> is not NULL, this indicates that there is a moving object within the monitoring range of the camera B. Therefore, the CSE will transmit the content of the second resource <AE2>, that is, the image captured by the camera B, to the third entity AE3 in the mobile phone of the security guard of the neighborhood, so that the security guard can timely confirm whether there is a suspicious situation at the non-important position of the neighborhood.

In the above example, the CSE is triggered to select which resource as the target resource to be operated, according to the updated contents in the first resource <AE1> and the second resource <AE2> respectively corresponding to the first application entity AE1 and the second application entity AE2 communicatively connected to the CSE.

Although the above examples mainly describe the operation on the target resource as acquiring the target resource, according to the principle of the present disclosure, it is not limited to acquiring the target resource, but includes performing various other processes on the target resource, such as updating the target resource, deleting the target resource, or notifying information about the target resource.

Figure 8:
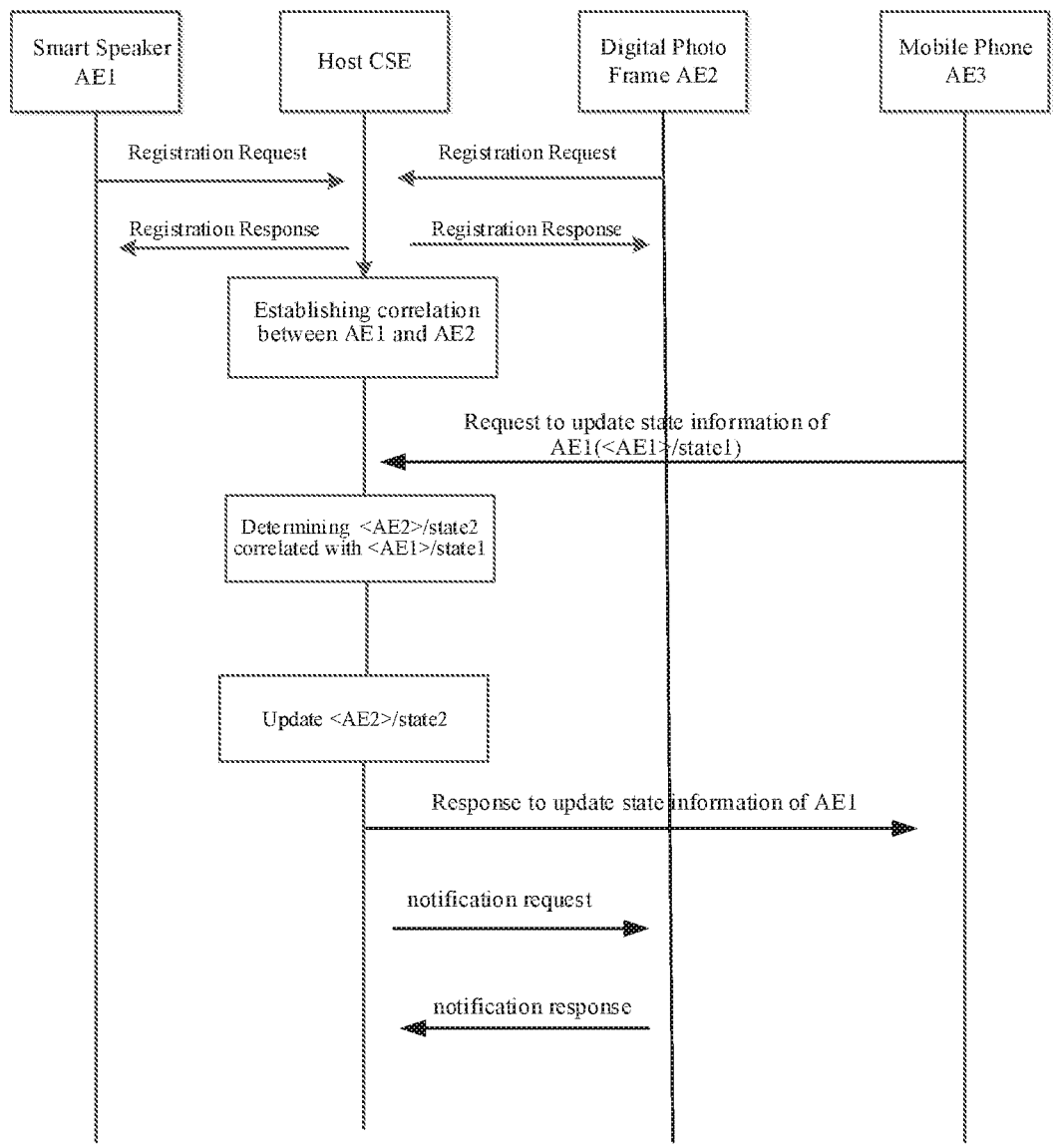

An example of an update operation on the target resource will be described in detail below with reference to FIG. 8. As shown in FIG. 8, for example, in the field of smart home, for example, a digital photo frame and a smart speaker of the user located in different rooms can be wirelessly connected with a set-top box in the home. A management software is installed on the set-top box, and the management software can be used as the common service entity CSE. An audio playing software is installed on the smart speaker, and the audio playing software can be used as the first application entity AE1. An image display software is installed on the digital photo frame, and the image display software can be used as the second application entity AE2. As shown in FIG.

8, the first application entity AE1 and the second application entity AE2 register at the CSE respectively, thus resources are created for the AE1 and AE2 on the CSE, for example, the first resource <AE1> and the second resource <AE2>. In addition, there may be no direct physical connection between the digital photo frame and the smart speaker, but a correlation (i.e., logical correlation) between the first resource <AE1> and the second resource <AE2> may be established, in an indirect manner by creating a resource group and correlating the first resource and the second resource as members of the resource group or in a direct manner by correlating them by directing an attribute of the first resource to the identifier of the second resource. Regarding the establishment of the correlation, please refer to the description above with respect to FIGS. 4A-4B, which will not be repeated here. In fact, user information stored in the background database of the CSE can be used as a trigger condition, for example, when the user registers the smart speaker and the digital photo frame at the set-top box respectively, the user information is usually provided to the common service entity CSE running on the set-top box, thus, a comparison can be performed and, and when the user information corresponding to the smart speaker and the user information corresponding to the digital photo frame are consistent, correlating the first resource <AE1> and the second resource <AE2> respectively corresponding to the first application entity AE1 and the second application entity AE2 can be triggered, so that the first application entity AE1 corresponding to the smart speaker and the second application entity AE2 corresponding to the digital photo frame can be automatically correlated.

An application program is installed on the user's mobile phone, and the application program can be used as the third entity AE3 that initiates a request to operate the target resource. The application program or the third entity AE3 can monitor the date, and transmit a request to the CSE to update the state "AE1/state1" of the first resource <AE1> on the day of the user's birthday, so that the smart speaker can play a piece of music congratulating the user's birthday at a predetermined time of the day. Before playing, the sensor of the smart speaker can detect whether the user is in the room. If the user happens not to be in the room at present, because the first resource <AE1> is correlated with the second resource <AE2>, the CSE will determine the state "AE2/state2" of the second resource <AE2> correlated with the first resource <AE1>, update the second resource <AE2> corresponding to the digital photo frame (for example, update the "AE2/state2") so that the second application entity AE2 corresponding to the second resource <AE2> updates the displayed image to an image of a birthday greeting card, and transmits a notification request to the second application entity AE2 corresponding to the digital photo frame.

Although in the above example, the second resource <AE2> correlated with the first resource <AE1> is determined as the target resource, thereby updating the image displayed by the digital photo frame, it is also possible to update the first resource <AE1> while updating the second resource <AE2> (for example, while updating the image displayed by the digital photo frame), so that the smart speaker can play music. In other words, according to the principle of the present disclosure, not only the resources correlated with the resources requested to be operated can be operated, but also the resources requested to be operated themselves can be operated together, which is not limited here.

In addition, as described above, according to the principle of the present disclosure, it is not limited to acquiring the target resource, but includes performing various other processes on the target resource, such as updating the target resource, deleting the target resource, or notifying information about the target resource.

For example, possible operations on the target resource will be briefly explained by taking a situation of the electric vehicle being charged with the charging pile as an example. An example of a re-creation operation on a target resource will be described in detail below with reference to FIG. 9.

Figure 9:
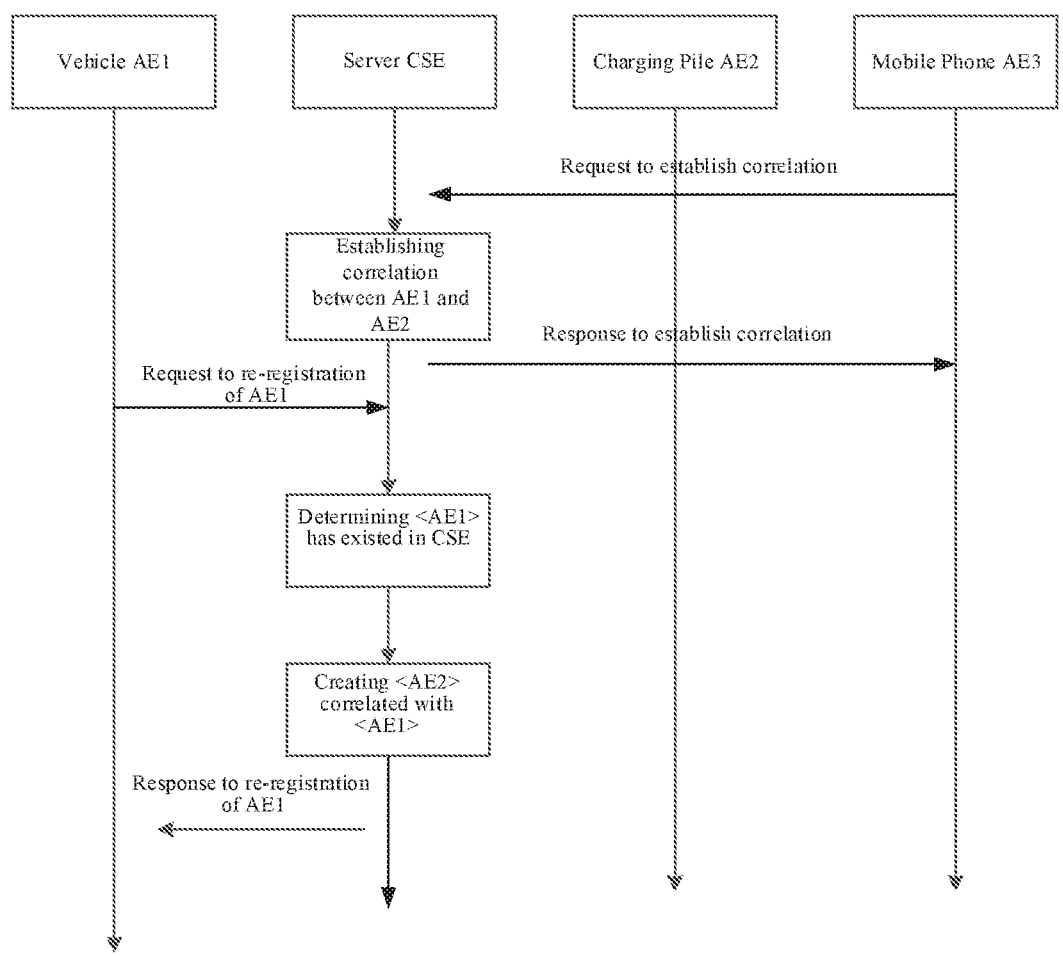

As shown in FIG. 9, a charging program module running on the electric vehicle can be taken as the first application entity AE1, a charging program module running on the charging pile can be taken as the second application entity AE2, and a charging management program module running on a server respectively connected with the electric vehicle and the charging pile can be taken as the common service entity CSE. Optionally, the server may be local or remote, the communication connection between the electric vehicle and the server may be wired or wireless, and the communication connection between the charging pile and the server may also be wired or wireless.

As described above, the first application entity AE1 and the second application entity AE2 may respectively transmit a registration request to the CSE, thus corresponding first resource <AE1> and second resource <AE2> are created on the CSE. Of course, as shown in FIG. 9, a correlation between the first resource <AE1> and the second resource <AE2> can be established when an establishment request including information on the correlation transmitted from the charging monitoring software running on the user's mobile phone (which can be the third entity AE3 that initiates a request to operate the target resource) to the CSE is received. Regarding the establishment of the correlation, please refer to the description above with respect to FIGS. 4A-4B, which will not be repeated here. As described above the correlation between the first resource <AE1> and the second resource <AE2> can also be established on the CSE when the vehicle and the charging pile are connected through cables. Therefore, the conditions that trigger the establishment of the correlation are not limited.

After completing charging this time, as a case, for example, the CSE may delete the second resource <AE2> corresponding to the common charging pile and reserve the first resource <AE1> corresponding to the charging program module of the vehicle. In a case where the user charges the vehicle with the common charging pile next time, when the first application entity AE1 corresponding to the charging module of the vehicle transmits a re-registration request to the CSE, if the CSE inquires that the AE has been registered before and that the first application entity AE1 corresponding to the charging module of the vehicle has been correlated with the entity corresponding to the charging pile, the CSE will automatically create a second resource <AE2> for the charging pile and return a re-registration response to the first application entity AE1.

According to the above example, when the CSE receives a registration request for a resource, the CSE can determine whether the resource has been registered, if so, the CSE can determine whether the resource has been correlated with other resources, and if it has been correlated with other resources and the other resources do not exist at present, the CSE can automatically re-register the other resources correlated. Otherwise, if the resource has not been registered, the CSE registers the resource and creates other resources correlated with the resource as needed. Optionally, if the other resources already exist, the other resources correlated can also be updated.

According to yet another embodiment of the present disclosure, in a case of determining a target resource as an operation object, the target resource is not limited to a single resource, but may include a resource group. For example, when an operation request for the first resource <AE1> as the target resource is received, when the first resource <AE1> itself is a member of a certain resource group <group>, one or more other members of the resource group <group> can be operated as the target resource in addition to the first resource <AE1>. This will be described in detail below with specific examples.

Figure 10:
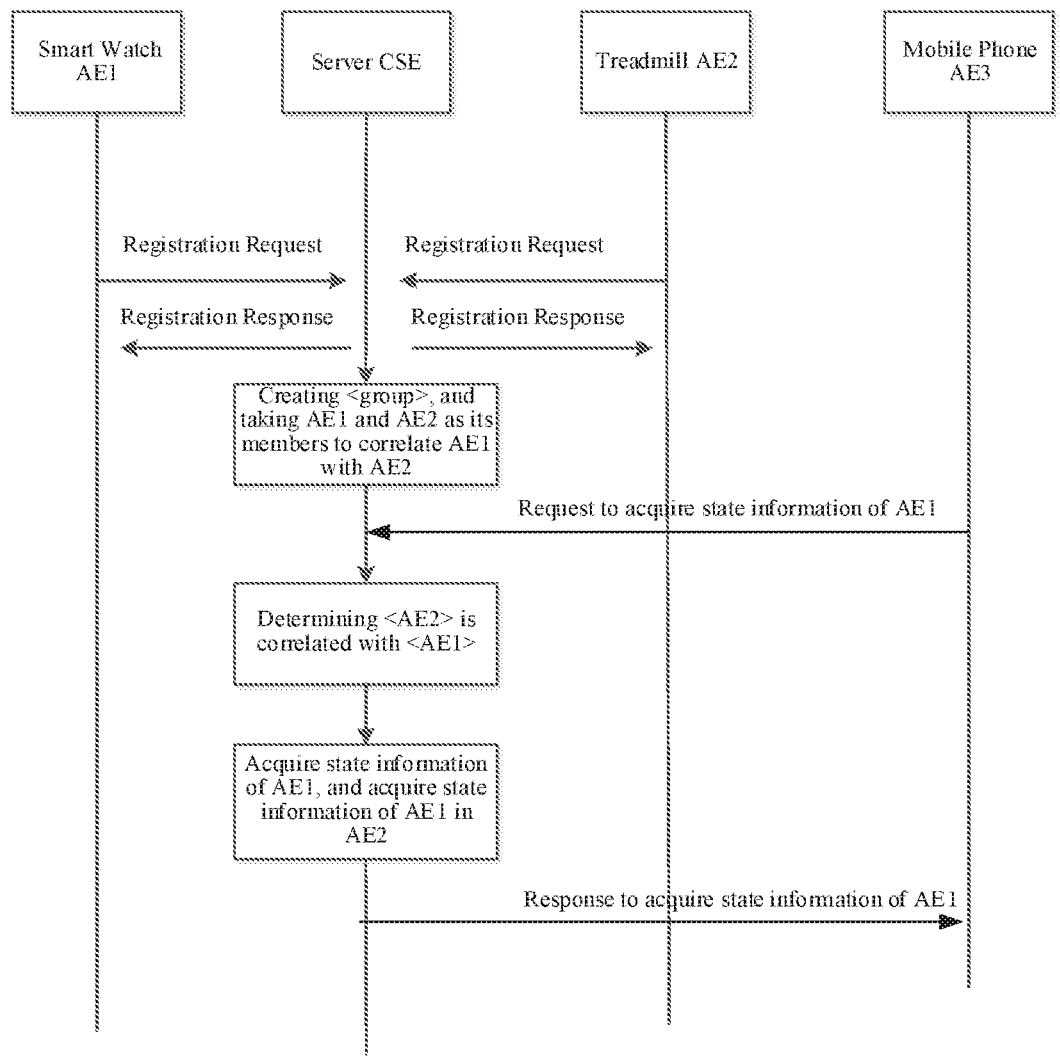

As shown in FIG. 10, taking a situation of a user exercising on a treadmill as an example, for example, a change in heart rate of the user can be monitored by a smart watch worn by the user, while the treadmill monitors energy consumption of the user. The first application entity AE1 corresponding to a monitoring software module running on the smart watch and the second application entity AE2 corresponding to a monitoring software module running on the treadmill are respectively registered at the common service entity CSE, and corresponding resources, for example, the first resource <AE1> and the second resource <AE2> are created. The common service entity may represent a software module on a common service platform that analyzes user's health, and the common service entity may be a service software installed on a remote server connected through a gateway/router in a gym, for example. The CSE correlates the resources corresponding to the first application entity AE1 and the second application entity AE2, for example, a certain resource group <group> can be created, and the first resource <AE1> corresponding to the first application entity AE1 and the second resource <AE2> corresponding to the second application entity AE2 are taken as members of the resource group <group>. When a fitness data recording software module (which is the third entity AE3 that initiates an operation request on the target resource) running on the user's mobile phone initiates a request to the common service entity CSE to acquire the data about variation of the heart rate monitored by the first application entity AE1 corresponding to the smart watch, in a case where the CSE determines that the first resource <AE1> corresponding to the smart watch belongs to the resource group <group>, the CSE takes other members (in this embodiment, the second resource <AE2>) belonging to the resource group <group> and the first resource <AE1> as the target resource, so that not only the data about variation of the heart rate monitored by the smart watch but also the energy consumption data monitored by the treadmill can be acquired, and the two are fed back to the requester AE3 who initiates the acquisition request.

According to this embodiment, when a request to operate a single resource as the target resource is received, by determining a resource group to which the single resource belongs, one or more other members (which may be all members) included in the resource group can also be operated as the target resource, thereby improving the efficiency of resource processing.

According to yet another embodiment of the present disclosure, in a case of determining a target resource as an operation object, the target resource is not limited to a single resource, but may include more than one resource groups. For example, when an operation request on a first resource <AE1> as the target resource is received, in a case where the first resource <AE1> itself is a member of a first resource group <group1>, it is determined that whether there are other resource groups correlated with the resource group <group1>, for example, when there is a second resource group <group2> correlated with the resource group <group1>, not only one or more members included in the first resource group <group1> but also one or more members included in the second resource group <group2> can be operated as the target resource. This will be described in detail below with specific examples.

Figure 11:
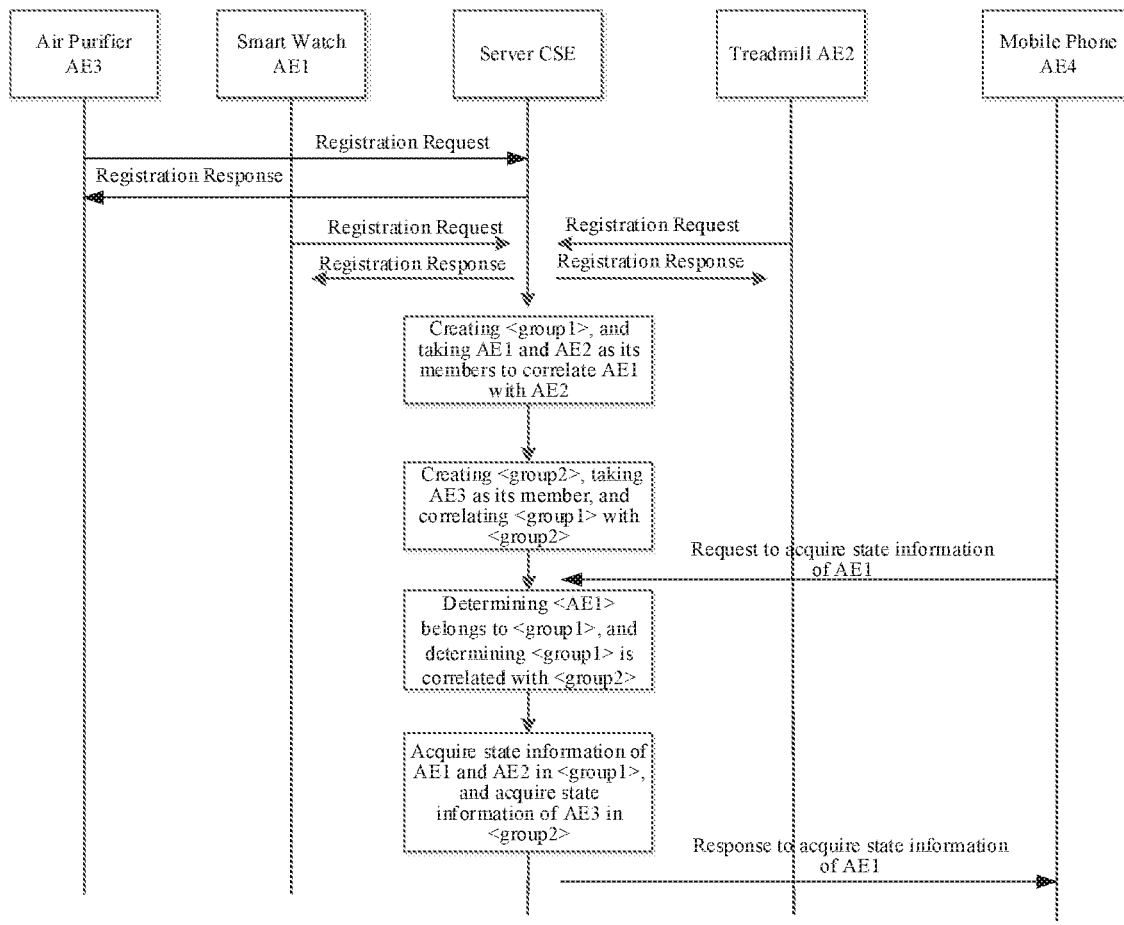

As shown in FIG. 11, taking a situation of a user exercising on a treadmill as an example, for example, variation of heart rate of the user can be monitored by a smart watch worn by the user, while the treadmill monitors energy consumption of the user, and an air purifier detects air quality in the room. The first application entity AE1 corresponding to a monitoring software module running on the smart watch, the second application entity AE2 corresponding to a monitoring software module running on the treadmill, and the third entity AE3 corresponding to a monitoring software module running on the air purifier are respectively registered at the common service entity CSE, and thus corresponding resources, for example, the first resource <AE1>, the second resource <AE2> and the third resource <AE3> are created. The common service entity may represent a software module on a common service platform that analyzes user's health, and the common service entity may be a service software installed on a remote server connected through a gateway/router in a gym, for example. As an example, the CSE can create a first resource group <group1>, and take resources corresponding to the first application entity AE1 and the second application entity AE2 as members of the first resource group <group1>, thereby correlating the first resource <AE1> with the second resource <AE2>. Similarly, for example, the CSE may also create a second resource group <group2>, take the resource corresponding to the third entity AE3 as a member of the second resource group <group2>, and correlate the second resource group <group2> with the first resource group <group1>, for example, by creating an attribute in the first resource group <group1> that directs to the identifier of the second resource group <group2>. Optionally, the CSE can also take the resource corresponding to the second application entity AE2 as a member of the second resource group <group2>, thereby correlating the second resource <AE2> with the third resource <AE3>. When a fitness data recording software module (which is a fourth entity AE4 that initiates an operation request on the target resource) running on the user's mobile phone initiates a request to the common service entity CSE to acquire the data about variation of the heart rate monitored by the first application entity AE1 corresponding to the smart watch, in a case where the CSE determines that the first resource <AE1> corresponding to the smart watch belongs to the first resource group <group>, the CSE takes other members (in this embodiment, the second resource <AE2>) belonging to the first resource group <group1> and the first resource <AE1> as the target resource, so that not only the data about variation of the heart rate monitored by the smart watch but also the energy consumption data monitored by the treadmill are acquired, and the two are fed back to the requester AE4 who initiates the acquisition request. At the same time, when the CSE determines that the first resource group <group1> and the second resource group <group2> are correlated, the CSE will also use one or more other members (in this embodiment, the third resource <AE3>) belonging to the second resource group <group2> as the target resource, so that the air quality data detected by the air purifier can also be acquired and fed back to the requester AE4 who initiates the acquisition request.

According to this embodiment, when a request to operate a single resource as the target resource is received, by determining a resource group to which the single resource belongs, not only one or more other members (which may be all members) included in the resource group can be taken as the target resource, but also one or more resources included in other resource groups correlated with the resource group can be taken as the target resource to be operated, thereby improving the efficiency of resource processing.

According to yet another embodiment of the present disclosure, in a case of determining a target resource as an operation object, a certain resource may be selected from a plurality of correlated resource groups as the target resource for operation. For example, when an operation request on a first resource <AE1> as the target resource is received, when the first resource <AE1> itself is a member of a first resource group <group1>, whether there are other group resources correlated with the resource group <group1> is determined. For example, when there is a second resource group <group2> correlated with the resource group <group1>, a certain resource can be selected as the target resource for operation from all members included in the first resource group <group1> and all members included in the second resource group <group2>. For example, if several resources record the same parameter, the resource whose parameter is with the highest precision can be selected as the target resource for operation. This will be described in detail below with specific examples.

Figure 12:
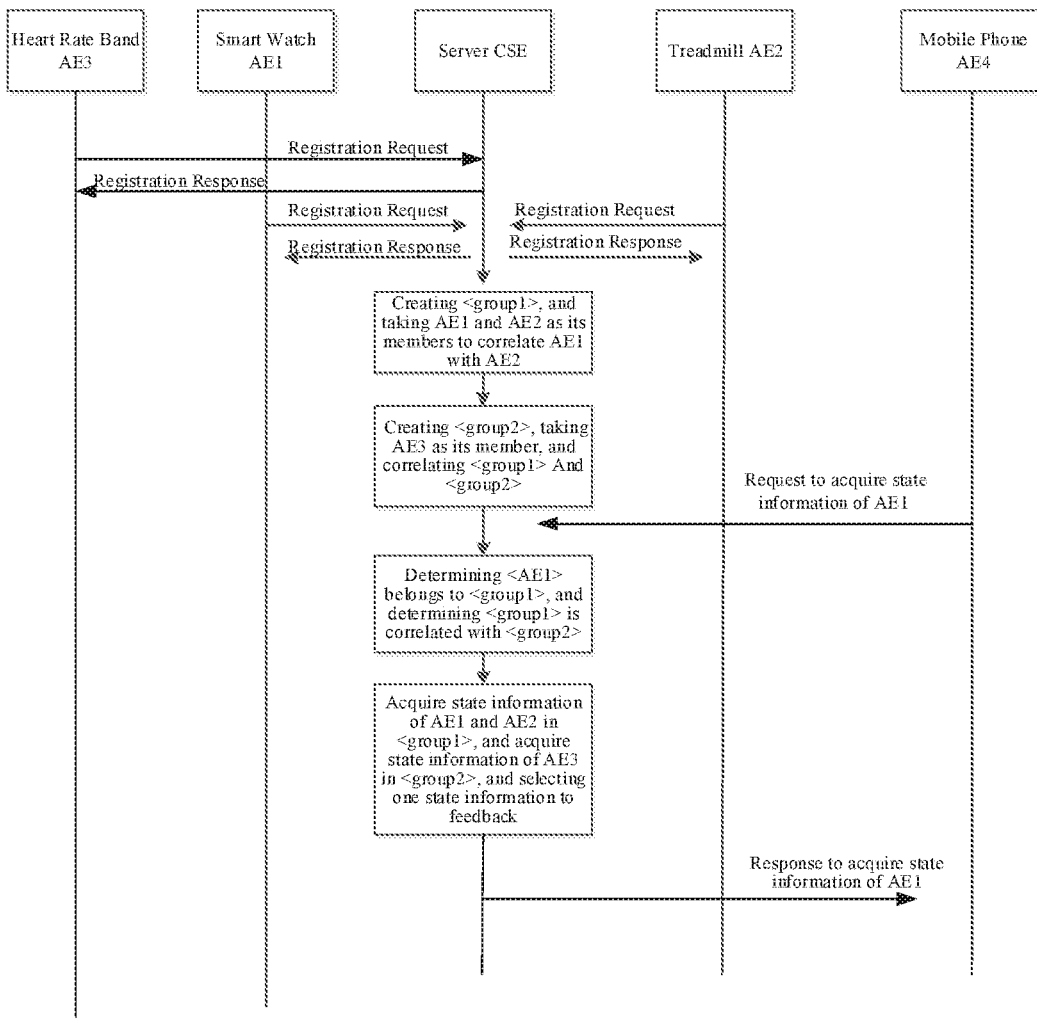

As shown in FIG. 12, taking a situation of a user exercising on a treadmill as an example, for example, variation of heart rate of the user can be detected through a heart rate band worn by the user. In addition, a smart watch worn by the user and the treadmill that the user uses to exercise can also provide data about variation of the heart rate of the user. The first application entity AE1 corresponding to a monitoring software module running on the smart watch, the second application entity AE2 corresponding to a monitoring software module running on the treadmill, and the third entity AE3 corresponding to a monitoring software module running on the heart rate band are respectively registered at the common service entity CSE, and thus corresponding resources, for example, the first resource <AE1>, the second resource <AE2> and the third resource <AE3> are created. The common service entity may represent a software module on a common service platform that analyzes user's health, and the common service entity may be a service software installed on a remote server connected through a gateway/router in a gym, for example. As an example, the CSE can create a first resource group <group>, and take the resources corresponding to the first application entity AE1 and the second application entity AE2 as members of the first resource group <group>, thereby correlating the first resource <AE1> with the second resource <AE2>. Similarly, for example, the CSE may also create a second resource group <group2>, take the resource corresponding to the third entity AE3 as a member of the second resource group <group2>, and correlate the second resource group <group2> with the first resource group <group1>, for example, by creating an attribute in the first resource group <group1> that directs to the identifier of the second resource group <group2>. Optionally, the CSE can also take the resource corresponding to the second application entity AE2 as a member of the second resource group <group2>, thereby correlating the second resource <AE2> with the third resource <AE3>. When a fitness data recording software module running on the user's mobile phone (which is a fourth entity AE4 that initiates an operation request on the target resource) initiates a request to the common service entity CSE to acquire the data about variation of the heart rate monitored by the first application entity AE1 corresponding to the smart watch, in a case where the CSE determines that the first resource <AE1> corresponding to the smart watch belongs to the first resource group <group1>, the CSE takes other members (in this embodiment, the second resource <AE2>) belonging to the first resource group <group1> and the first resource <AE1> as the target resource, so that not only the data about variation of the heart rate provided by the smart watch but also the data about variation of the heart rate provided by the treadmill are acquired. At the same time, when the CSE determines that the first resource group <group1> and the second resource group <group2> are correlated, the CSE will also use one or more other members (in this embodiment, the third resource <AE3>) belonging to the second resource group <group2> as the target resource, so that the data about variation of the heart rate monitored by the heart rate band can also be acquired. Through a comparison, for example, the CSE determines that the precision of the data about variation of the heart rate detected by the heart rate band is the highest, therefore, the data stored by the third resource <AE3> is fed back to the requester AE4 who initiates the acquisition request.

According to this embodiment, when a request to operate a single resource as the target resource is received, by determining a resource group to which the single resource belongs and other resource groups correlated with the resource group, an appropriate resource can be selected from one or more resource groups as the target resource for operation, thereby improving the flexibility of resource processing.

Optionally, according to the embodiments of the present disclosure, various methods can be adopted to establish the correlation between respective resources. The following will be described in detail with reference to FIGS. 13-15.

Figure 13:
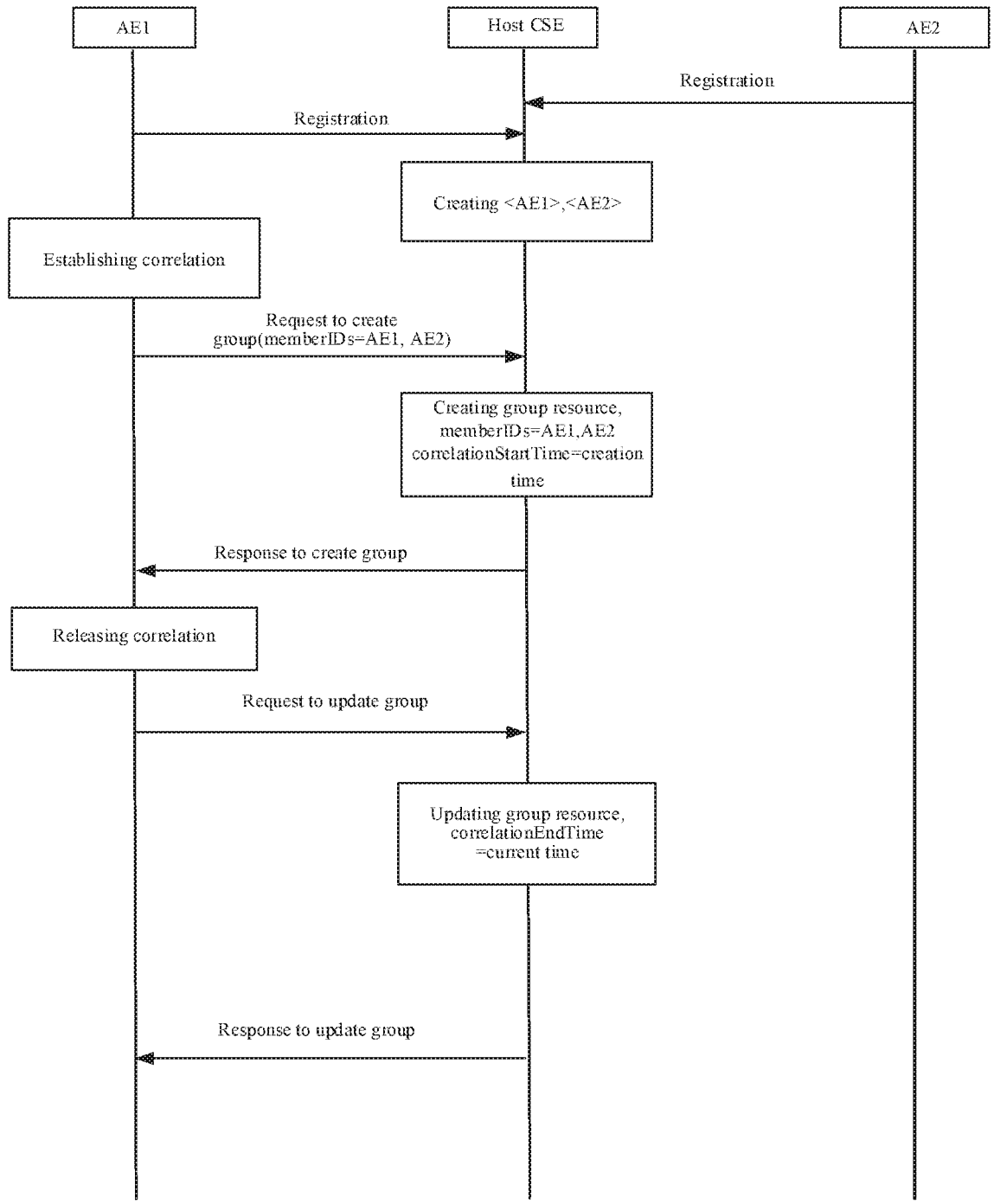
FIGS. 13-15 illustrate a process for correlating a plurality of resources according to an embodiment of the present disclosure.

FIG. 13 shows an example of establishing a correlation between the first resource <AE1> and the second resource <AE2> according to an embodiment of the present disclosure. As shown in FIG. 13, the first application entity AE1 and the second application entity AE2 respectively transmit a registration request to the common service entity CSE, so that corresponding first resource <AE1> and second resource <AE2> are respectively created on the CSE. When the correlation between the first resource <AE1> and the second resource <AE2> needs to be established, the first application entity AE1 (or the second application entity AE2) transmits a request for creating a resource group <group> to the CSE, for example, wherein the first resource <AE1> and the second resource <AE2> are requested as members of the created resource group <group>. Accordingly, in response to the request, the CSE creates a group resource <group>, and includes identifiers of the first resource <AE1> and the second resource <AE2> in its member list "memberIDs", thereby taking the first resource <AE1> and the second resource <AE2> as its members.

Figure 16A:
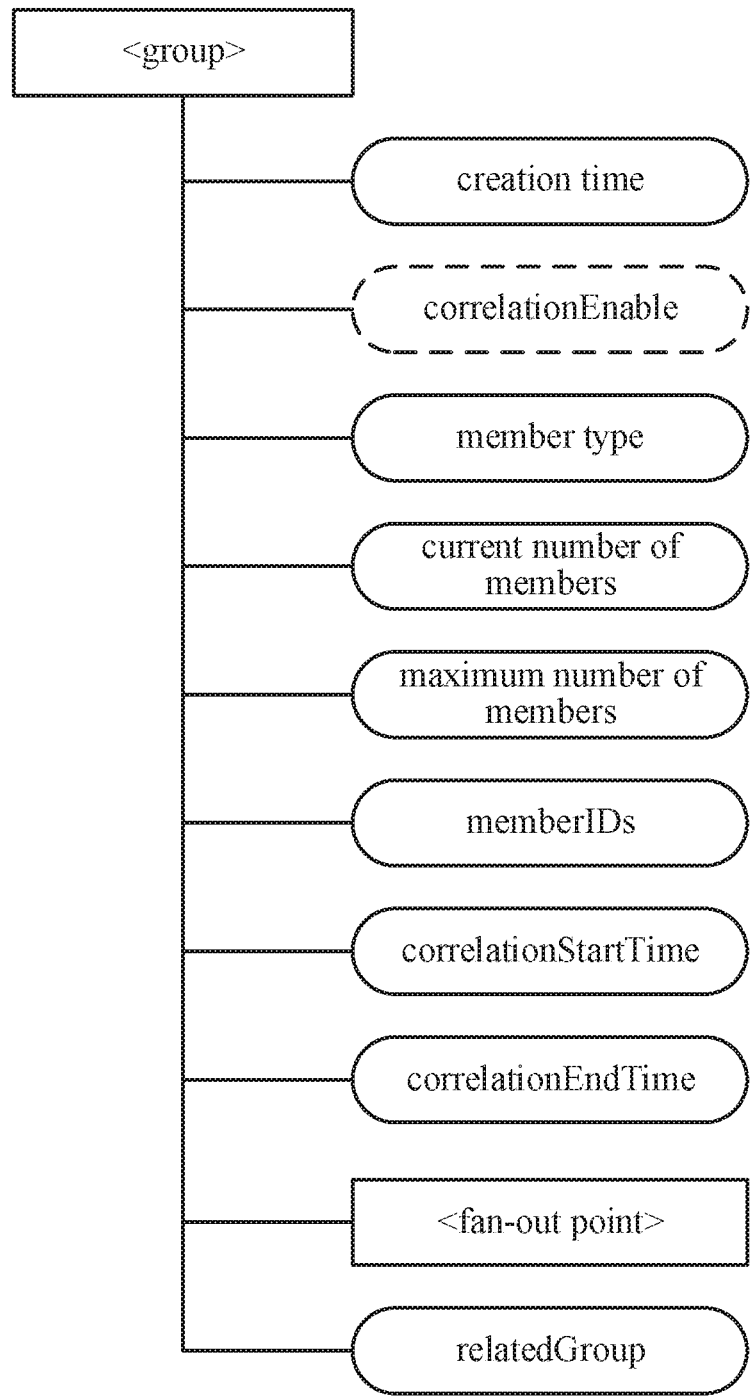
FIGS. 16A-16B respectively illustrate structures of a resource group and an entity resource that can be used for correlating resources according to embodiments of the present disclosure.

Optionally, as shown in FIG. 16A, the group resource <group> also includes an attribute: a start time for resource correlation "correlationStartTime". According to this embodiment, when the CSE creates the group resource, the start time for resource correlation "correlationStartTime" is set to a time at which the creation is completed, thereby correlating the first resource <AE1> with the second resource <AE2>. When the creation of the resource group is completed, the CSE transmits a response indicating the creation of the group resource is completed to the requester AE1.

Optionally, when it is necessary to release the correlation between the first resource <AE1> and the second resource <AE2>, the first application entity AE1 (or the second application entity AE2) transmits a request to update the resource group <group> to the CSE, for example. Accordingly, in response to the request, the CSE updates the resource group <group>.

Optionally, as shown in FIG. 16A, the resource group <group> further includes an attribute: an end time for resource correlation "correlationEndTime". According to this embodiment, when the CSE updates the resource group, the end time for resource correlation "correlationEndTime" is set to a time at which the update is completed, thereby releasing the correlation between the first resource <AE1> and the second resource <AE2>. When the update of the resource group is completed, the CSE transmits a response indicating that the update of the resource group is completed to the requester AE1.

According to this embodiment, by creating the resource group and taking the first resource <AE1> and the second resource <AE2> as its members and by setting attributes of the resource group (the start time for resource correlation "correlationStartTime" and the end time for resource correlation "correlationEndTime") to establish or release the correlation between the first resource <AE1> and the second resource <AE2>, the correlation between the members of the resource group can be set flexibly without changing the members of the resource group.

Figure 14:
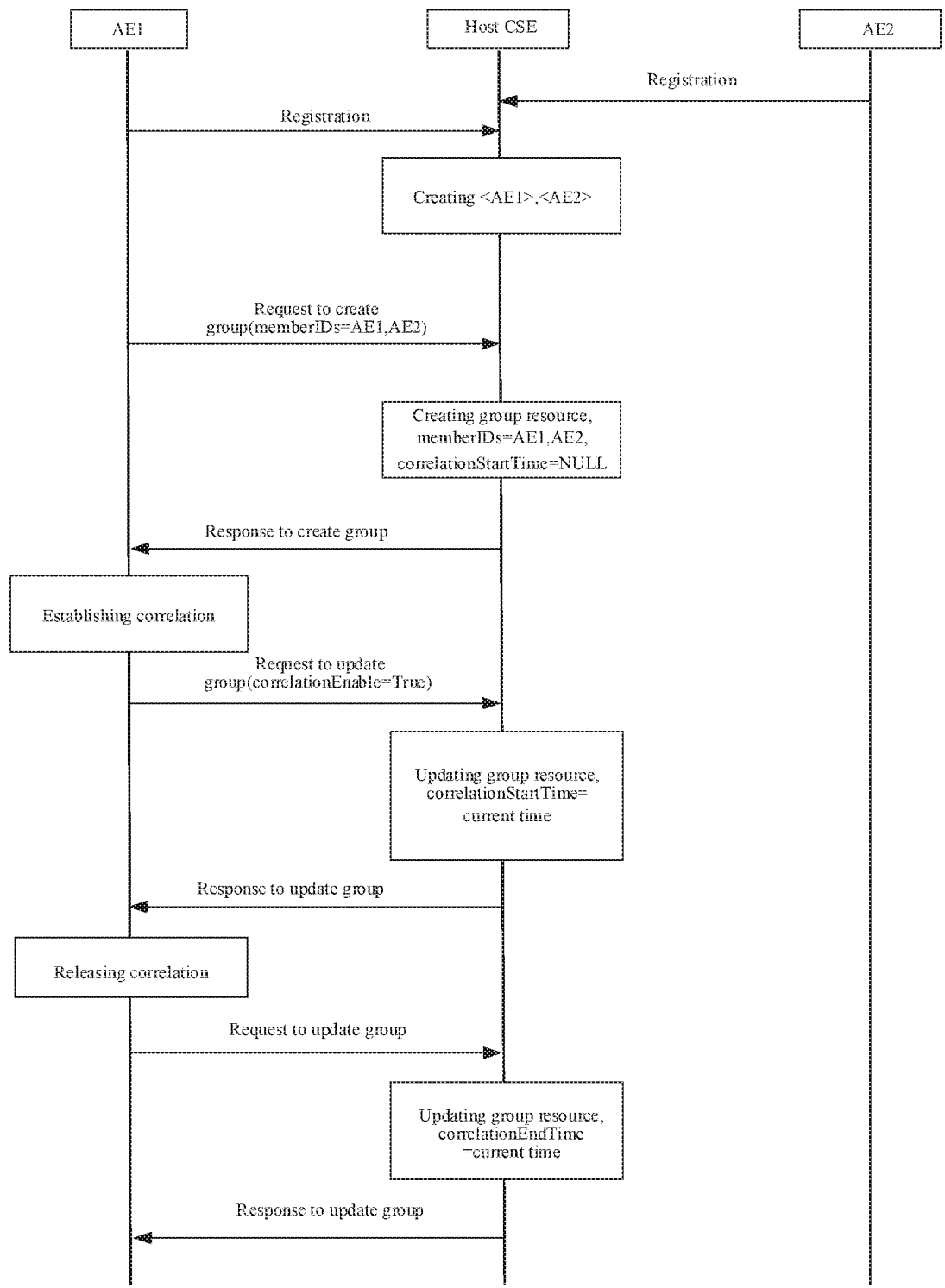

FIG. 14 shows an example of establishing a correlation between the first resource <AE1> and the second resource <AE2> according to another embodiment of the present disclosure. As shown in FIG. 14, the first application entity AE1 and the second application entity AE2 respectively transmit a registration request to the common service entity CSE, so that corresponding first resource <AE1> and second resource <AE2> are respectively created on the CSE, and the first application entity AE1 (or the second application entity AE2) transmits a request to create a resource group <group> to the CSE, wherein the first resource <AE1> and the second resource <AE2> are requested as members of the created resource group <group>. Accordingly, in response to the request, the CSE creates a group resource <group>, and includes identifiers of the first resource <AE1> and the second resource <AE2> in its member list "memberIDs", thereby taking the first resource <AE1> and the second resource <AE2> as its members.

As described above, optionally, the resource group <group> may include an attribute: a start time for resource correlation "correlationStartTime". According to this embodiment, when the CSE creates a resource group, the start time for resource correlation "correlationStartTime" is set to NULL, indicating that no correlation has been established between the first resource <AE1> and the second resource <AE2> at a time when the creation of the resource group is completed. Then, the CSE transmits a response indicating that the creation of the resource group is completed to the requester AE1.

Optionally, when it is necessary to establish a correlation between the first resource <AE1> and the second resource <AE2>, the first application entity AE1 (or the second application entity AE2) transmits a request to update the resource group <group> to the CSE, for example, wherein establishing the correlation between the first resource <AE1> and the second resource <AE2> is requested. Optionally, as shown in FIG. 16A, the resource group <group> may include an attribute: an enable flag for resource correlation "correlationEnable". Accordingly, in response to the request, the CSE updates the resource group <group>. According to this embodiment, when the CSE updates the resource group, the enable flag for resource correlation "correlationEnable" is set to true, thereby establishing the correlation between the first resource <AE1> and the second resource <AE2>, and the start time for resource correlation "correlationStartTime" is set to a time at which the update is completed, thereby recording the start time for resource correlation. When the update of the resource group is completed, the CSE transmits a response indicating that the update of the resource group is completed to the requester AE1.

Optionally, when it is necessary to release the correlation between the first resource <AE1> and the second resource <AE2>, for example, the first AE1 (or the second application entity AE2) transmits a request to update the resource group to the CSE. Accordingly, in response to the request, the CSE updates the resource group <group>. According to this embodiment, when the CSE updates the resource group, the enable flag for resource correlation "correlationEnable" is reset so as to release the correlation between the first resource <AE1> and the second resource <AE2>, and the end time for resource correlation "correlationEndTime" is set to a time at which the update is completed, thereby recording the end time and the start time of the correlation. When the update of the resource group is completed the CSE transmits a response indicating that the update of the resource group is completed to the requester AE1.

According to this embodiment, by creating the resource group and taking the first resource <AE1> and the second resource <AE2> as its members, by setting the attribute of the resource group (the enable flag for resource correlation "correlationEnable") to establish or release the correlation between the first resource <AE1> and the second resource <AE2>, and by recording the specific times of the correlation through the start time for resource correlation "correlationStartTime" and the end time for resource correlation "correlationEndTime", the correlation between the members of the resource group can be flexibly set without changing the members of the resource group.

Figure 15:
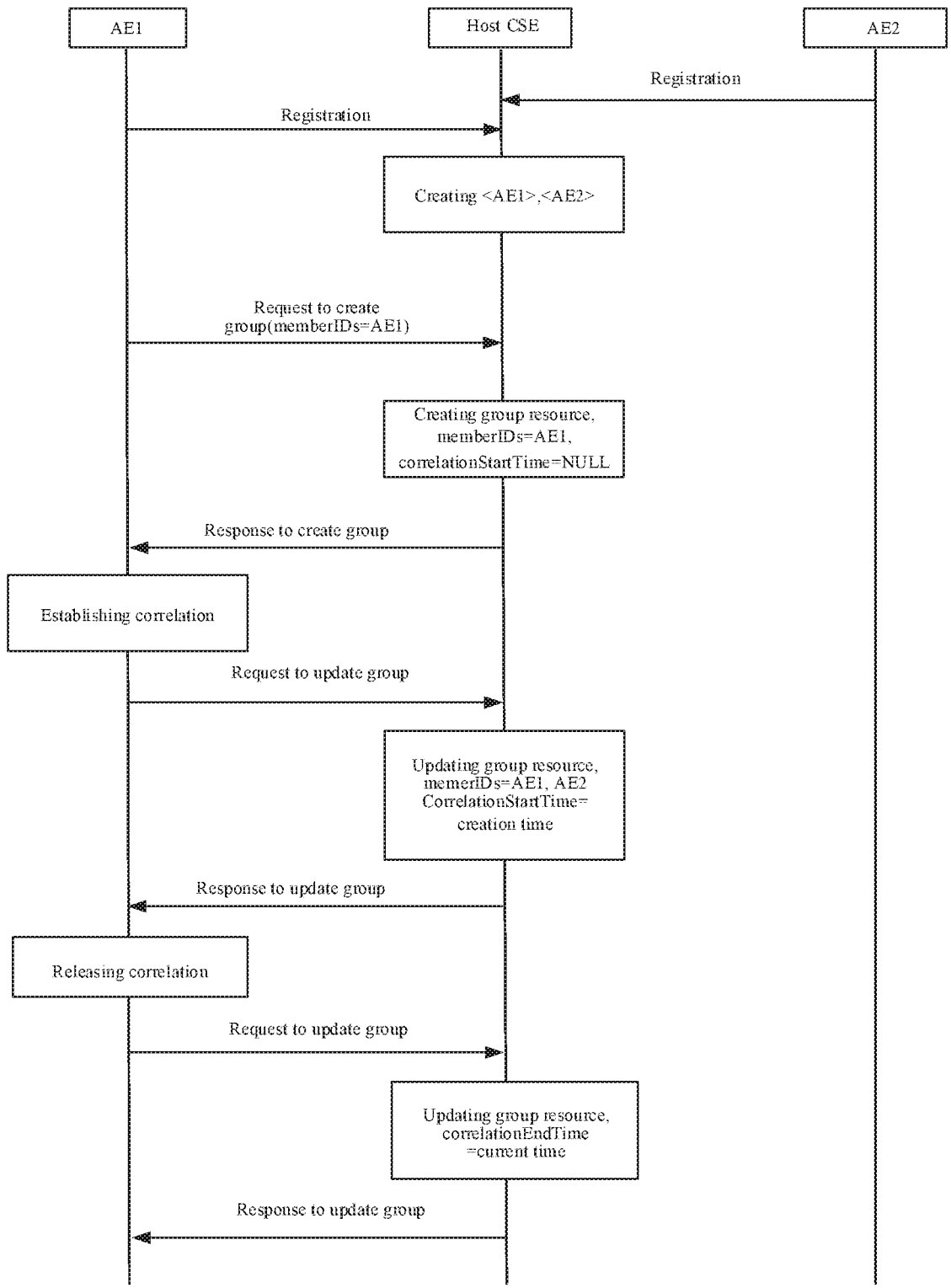

FIG. 15 shows an example of establishing a correlation between the first resource <AE1> and the second resource <AE2> according to yet another embodiment of the present disclosure. As shown in FIG. 15, the first application entity AE1 and the second application entity AE2 respectively transmit a registration request to the common service entity CSE, so that corresponding first resource <AE1> and second resource <AE2> are respectively created on the CSE, and the first application entity AE1 (or the second application entity AE2) transmits a request to create a resource group <group> to the CSE, wherein the first resource <AE1> is requested as a member of the created resource group <group>. Accordingly, in response to the request, the CSE creates a group resource <group>, and includes the identifier of the first resource <AE1> in its member list "memberIDs", thereby taking the first resource <AE1> as its member. As described above, optionally, the resource group <group> may include an attribute: a start time for resource correlation "correlationStartTime". According to this embodiment, when the CSE creates a resource group, resources correlated with the first resource have not been selected, so the start time for resource correlation "correlationStartTime" is set to NULL, indicating that no correlation has been established between the first resource <AE1> and other resources at the time when the creation of the resource group is completed. Then, the CSE transmits a response indicating that the creation of the resource group is completed to the requester AE1.

Optionally, when it is necessary to establish a correlation between the first resource <AE1> and the second resource <AE2>, for example, the first application entity AE (or the second application entity AE2) transmits a request to update the resource group <group> to the CSE, wherein establishing the correlation between the first resource <AE1> and the second resource <AE2> is requested. In response to the request, the CSE updates the resource group <group>, adds the identifier of the second resource <AE2> to the member list, and sets the start time for resource correlation "correlationStartTime" to a time at which the update is completed, thereby establishing the correlation between the first resource <AE1> and the second resource <AE2>. When the update of the resource group is completed, the CSE transmits a response indicating that the update of the resource group is completed to the requester AE1.

Optionally, when it is necessary to release the correlation between the first resource <AE1> and the second resource <AE2>, for example, the first application entity AE1 (or the second application entity AE2) transmits a request to update the resource group <group> to the CSE. Accordingly, in response to the request, the CSE updates the resource group <group>. According to this embodiment, when the CSE updates the resource group, the end time for resource correlation "correlationEndTime" is set to a time at which the update is completed, thereby releasing the correlation between the first resource <AE1> and the second resource <AE2>. When the update of the resource group is completed, the CSE transmits a response indicating that the update of the resource group is completed to the requester AE1.

According to this embodiment, by creating the resource group and taking the first resource <AE1> as its member, by updating the resource group by adding the identifier of the second resource <AE2> to the member list of the resource group when the correlation is requested, and by setting attributes of the resource group (the start time for resource correlation "correlationStartTime" and the end time for resource correlation "correlationEndTime") to establish or release the correlation between the first resource <AE1> and the second resource <AE2> respectively, the correlation between the members of the resource group can be set flexibly without changing the members of the resource group.

It should be noted that although FIG. 15 describes that the correlation between the first resource <AE1> and the second resource <AE2> are established or released by using the start time for resource correlation "correlationStartTime" and the end time for resource correlation "correlationEndTime", respectively, it is also possible that, as shown in FIG. 14, an enable flag for resource correlation "correlationEnable" is adopted to establish or release the correlation between the first resource <AE1> and the second resource <AE2>, and the specific times of the correlation are recorded by the start time for resource correlation "correlationStartTime" and the end time for resource correlation "correlationEndTime".

As shown in FIG. 16A, the resource group <group> also includes an attribute "relatedGroup", which is used to record a correlation with other resource groups. For example, multiple resource groups can be correlated by setting identifiers of other groups in the "relatedGroup". For example, the identifier of the second resource group <group2> can be set in the attribute "relatedGroup" of the first resource group <group1> to correlate the first resource group <group1> with the second resource group <group2>. Optionally, as shown in FIG. 16A, the resource <group> may also include other attributes: member type, creation time, current number of members, maximum number of members, member ID, and sub-resource <fan-out point>, etc. Of course, the resource <group> can also include other sub-resources and/or attributes as required, which will not be described in detail here.

Optionally, for example, when the members of the first resource group <group 1> include the first resource <AE1> and the members of the second resource group <group2> include the second resource <AE2>, the correlation between the first resource <AE1> and the second resource <AE2> can be established or released in conjunction with the attributes shown in FIG. 16A: the start time for resource correlation "correlationStartTime", the end time for resource correlation "correlationEndTime", and the enable flag for resource correlation "correlationEndTime".

For example, when an update request for the first resource group is received to establish a correlation between the member <AE1> of the first resource group and the member <AE2> of the second resource group, the start time for resource correlation "correlationStartTime" may be set to a time at which the setting of the attribute "relatedGroup" in the first resource group to direct to the identifier of the second resource group is completed, thereby establishing the correlation between the member <AE1> of the first resource group and the member <AE2> of the second resource group.

Similarly, when an update request for the first resource group is received to release the correlation between the member <AE1> of the first resource group and the member <AE2> of the second resource group, the end time for resource correlation "correlationEndTime" may be set to a time at which the update of the first resource group is completed, so as to release the correlation between the member <AE1> of the first resource group and the member <AE2> of the second resource group.

Optionally, when the update request for the first resource group is received to establish the correlation between the member <AE1> of the first resource group and the member <AE2> of the second resource group, the enable flag for resource correlation may be set to true to establish the correlation between the member <AE1> of the first resource group and the member <AE2> of the second resource group, and the start time for the correlation of <AE1> and <AE2> may be recorded using the start time for resource correlation "correlationStartTime".

Similarly, when the update request for the first resource group is received to release the correlation between the member <AE1> of the first resource group and the member <AE2> of the second resource group, the enable flag for resource correlation may be reset to release the correlation between the member <AE1> of the first resource group and the member <AE2> of the second resource group, and the end time of the correlation of <AE1> and <AE2> may be recorded using the end time for resource correlation "correlationEndTime".

Figure 16B:
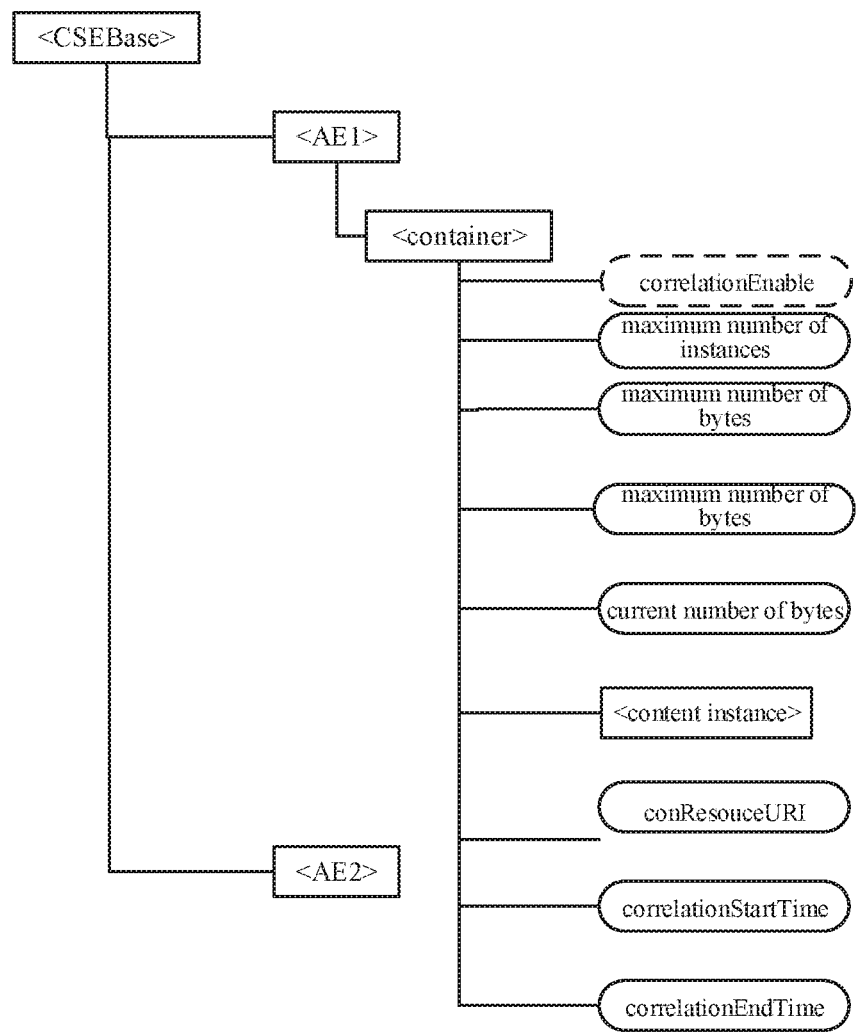

FIG. 16B shows a method of correlating a plurality of resources using attributes of an application entity AE according to an embodiment of the present disclosure. Compared with FIG. 4B, the attributes of resource <AE1> in FIG. 16B also include the start time for resource correlation "correlationStartTime" and the end time for resource correlation "correlationEndTime". As shown in FIG. 16B, according to the principle of the present disclosure, the attributes of the resource <AE1> may further include an enable flag for resource correlation "correlationEnable".

Similar to FIG. 4B, the attribute "conResourceURI" under the first resource <AE1> can be set to direct to the identifier of the second resource <AE2>.

Optionally, the correlation between the first resource <AE1> and the second resource <AE2> can be established or released in conjunction with the attributes shown in FIG. 16B: the start time for resource correlation "correlationStartTime", the end time for resource correlation "correlationEndTime", and the enable flag for resource correlation "correlationEnable".

For example, when an update request or a creation request for the first resource <AE1> is received to establish a correlation between the first resource <AE1> and the second resource <AE2>, the start time for resource correlation "correlationStartTime" may be set to a time at which the attribute "conResourceURI" in the first resource <AE1> is set to direct to the identifier of the second resource <AE2> is completed, thereby establishing the correlation between the first resource <AE1> and the second resource <AE2>.

Similarly, when an update request for the first resource is received to release the correlation between the first resource <AE1> and the second resource <AE2>, the end time for resource correlation "correlationEndTime" may be set to a time at which the update of the first resource is completed, so as to release the correlation between the first resource <AE1> and the second resource <AE2>.

Optionally, when an update request for the first resource is received to establish the correlation between the first resource <AE1> and the second resource <AE2>, the enable flag for resource correlation "correlationEnable" may be set to true to establish the correlation between the first resource <AE1> and the second resource <AE2>, and the start time of the correlation of the <AE1> and <AE2> may be recorded using the start time for resource correlation "correlationStartTime".

Similarly, when the update request for the first resource is received to release the correlation between the first resource <AE1> and the second resource <AE2>, it is also possible to reset the enable flag for resource correlation "correlationEnable" to release the correlation between the first resource <AE1> and the second resource <AE2>, and the end time of the correlation of <AE1> and <AE2> may be recorded using the end time for resource correlation "correlationEndTime".

Figure 17:
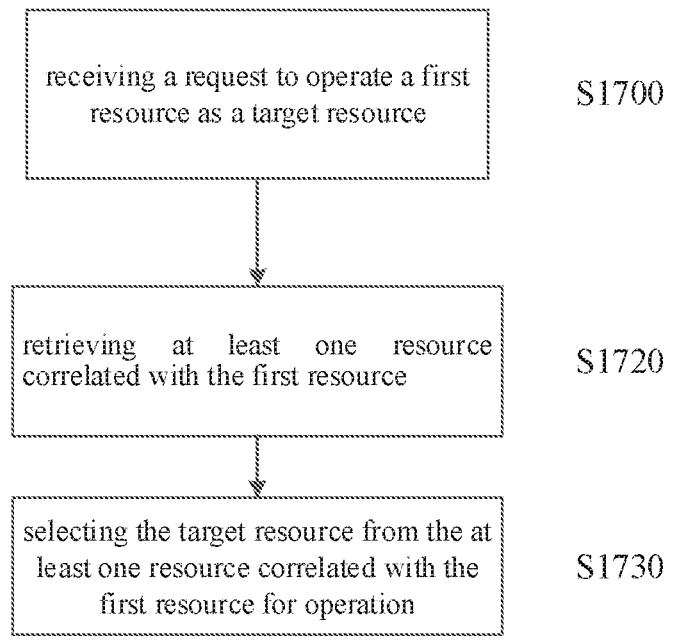
FIG. 17 schematically illustrates a flowchart of a method for determining the target resource for operation according to an embodiment of the present disclosure.

According to an aspect of the present disclosure, a method of operating a resource is provided, as shown in FIG. 17, comprising: S1700, receiving a request to operate a first resource as a target resource; S1720, retrieving at least one resource correlated with the first resource; and S1730, selecting the target resource from the at least one resource correlated with the first resource for operation.

Optionally, the method further comprises: creating a first resource group, wherein a member list of the first resource group includes an identifier of the first resource, so that the first resource is a member of the created first resource group.

Optionally, in the method, in a case where the first resource group is created, the member list of the first resource group further includes an identifier of a second resource, so that the second resource is a member of the first resource group.

Optionally, the method further comprises: creating a second resource group, wherein a member list of the second resource group includes an identifier of a second resource, so that the second resource is a member of the created second resource group; and setting an attribute in the first resource group that directs to an identifier of the second resource group, so as to correlate the first resource group with the second resource group.

Optionally, the method further comprises: setting an attribute in the first resource that directs to an identifier of a second resource.

Optionally, the method further comprises: accessing the first resource group or the first resource, and acquiring the second resource correlated with the first resource.

Optionally, the method further comprises: selecting the target resource according to at least one of: update time, update precision, and updated content of data recorded by the first resource and the second resource, and operating the target resource.

Optionally, the method further comprises: selecting at least one of the second resource and the first resource as the target resource.

Optionally, in the method, the attribute of the first resource group includes a start time for resource correlation, and the method further comprises: setting the start time for resource correlation to a time at which the creation of the first resource group is completed.

Optionally, in the method, the attribute of the first resource group includes a start time for resource correlation and an enable flag for resource correlation, and the method further comprises: in a case where an update request for the first resource group for establishing a correlation between the first resource and the second resource is received, setting the enable flag for resource correlation to true, and setting the start time for resource correlation to a time at which the update of the first resource group is completed.

Optionally, in the method, the attribute of the first resource group includes a start time for resource correlation, and the method further comprises: in a case where an update request for the first resource group for establishing a correlation between the first resource and the second resource is received, adding an identifier of a second resource to the member list of the first resource group so that the second resource become a member of the first resource group, and setting the start time for resource correlation to a time at which the update of the first resource group is completed.

Optionally, in the method, the first resource group further includes an attribute of a start time for resource correlation, and the method comprises: setting the start time for resource correlation to a time at which the setting of an attribute in the first resource group that directs to the identifier of the second resource group is completed.

Optionally, in the method, the attribute of the first resource group further includes an attribute of an end time for resource correlation, and the method further comprises: in a case where an update request for the first resource group for releasing the correlation between the first resource and the second resource is received, setting the end time for resource correlation to a time at which the update of the first resource group is completed.

Optionally, the method further comprises: setting an attribute under the first resource that directs to an identifier of a second resource.

Optionally, in the method, the first resource comprises an attribute of a start time for resource correlation, and the method further comprises setting the start time for resource correlation to a time at which the setting of the attribute in the first resource that directs to the identifier of the second resource is completed.

Optionally, in the method, the first resource further comprises an attribute of an end time for resource correlation, and the method further comprises: in a case where an update request for the first resource for releasing the correlation between the first resource and the second resource is received, setting the end time for resource correlation to a time at which updating the first resource is completed.

Optionally, in the method, in addition to the second resource, the member list of the second resource group further includes at least one member correlated with the second resource, the method further comprises: selecting one or more members listed in the member list of the second resource group as the target resource for operation.

Optionally, the method further comprises: setting one or more members listed in the member list of the first resource group as the target resource for operation.

Optionally, the method further comprises: selecting one or more resources correlated with the first resource as the target resource for operation according to at least one of: update time, update precision and updated content of data recorded by members listed in the member lists of the first resource group and the second resource group.

Optionally, in the method, the operation on the target resource comprises at least one of: acquiring the target resource, updating the target resource, deleting the target resource, recreating the target resource, and transmitting a notification to the target resource.

Optionally, the first resource and the second resource belong to the same entity or different entities.

Figure 18:
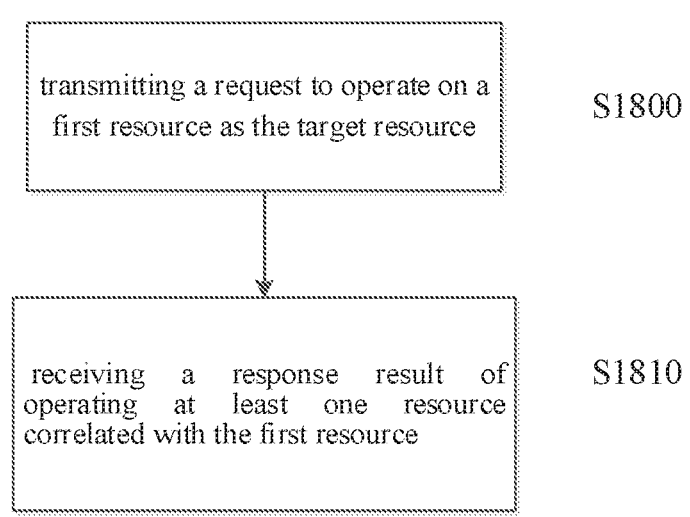
FIG. 18 schematically illustrates a flowchart of a method for providing the target resource to be operated on according to an embodiment of the present disclosure.

According to another aspect of the present disclosure, a method of operating a resource is provided, as shown in FIG. 18. The method comprises: S1800, transmitting a request to operate a first resource as the target resource; and S1810, receiving a response result of operating at least one resource correlated with the first resource.

Optionally, in the method, the first resource and the at least one resource correlated therewith are members of a first resource group.

Optionally, in the method, the first resource and the at least one resource correlated therewith are a member of a first resource group and a member of a second resource group, respectively, and the first resource group including an attribute that directs to an identifier of the second resource group.

Optionally, in the method, the first resource includes an attribute that directs to an identifier of the at least one resource.

Optionally, the method further comprises updating the second resource either actively or in response to a request of a common service entity.

Optionally, the second resource is different from the first resource in at least one of: update time, updated content, and precision of the updated data.

Figure 19:
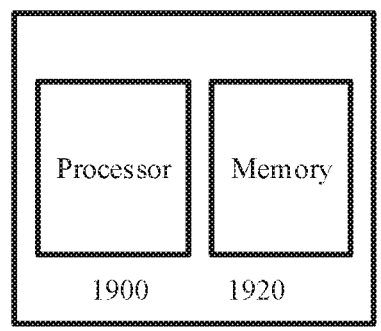
FIG. 19 illustrates a block diagram of a terminal according to an embodiment of the present disclosure.

According to another aspect of the present disclosure, there is provided a terminal, as shown in FIG. 19, comprising a processor 1900 and a memory 1920, wherein the memory is used to store program instructions which, when executed by the processor, cause the processor to implement the above-described method of operating a resource as shown in FIG. 18.

Optionally, the above terminal may include, but is not limited to, a mobile phone, an electronic book, a PDA, an intelligent bracelet, a smart speaker, a navigator, a music player, a tablet computer, a set-top box, a home appliance such as a microwave oven, an electric oven, a refrigerator, a washing machine, a water heater, an air conditioner, etc.

Figure 20:
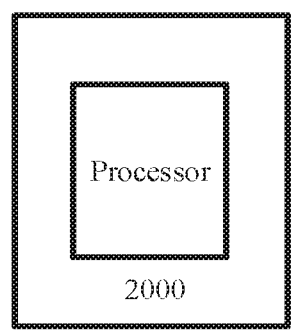
FIG. 20 illustrates a block diagram of a node device according to an embodiment of the present disclosure.

According to another aspect of the present disclosure, there is provided a node device, as shown in FIG. 20, comprising a processor 2000, wherein the processor is configured to perform the above-described method of operating a resource, as shown with reference to FIG. 17.

Optionally, the above-described node device may include, but is not limited to, a server, a personal computer, a set-top box, a mobile phone, an electronic book, a PDA, an intelligent bracelet, a smart speaker, a navigator, a music player, a tablet computer, etc.

Optionally, the above-described processor includes one or more microprocessors that can process data signals and can include various computing structures, such as a complex instruction set computer (CISC) structure, a reduced instruction set computer (RISC) structure, or a structure that implements a combination of various instruction sets. In some embodiments, the processor may also be a microprocessor, such as an X86 processor or an ARM processor, or may be a digital processor (DSP) or the like.

Optionally, the memory may include, for example, volatile memory and/or non-volatile memory. The volatile memory may include, for example, a random access memory (RAM) and/or cache, etc. The non-volatile memory may include, for example, a read only memory (ROM), hard disk, flash memory, and the like.

According to yet another aspect of the present disclosure, there is also provided a computer-readable storage medium on which program instructions are stored, when executed by a computer, the program instructions can implement the above-described method.

According to the method and the device provided by the embodiments of the disclosure, according to the correlation of each resource, a correlated resource may be selected as a target resource for operation, so that the data precision of resource processing and the efficiency of resource processing are improved.

In this document, relational terms such as "first" and "second" are only used to distinguish one entity or operation from another entity or operation, and do not necessarily require or imply any such actual relationship or order between these entities or operations. Moreover, the terms "comprise", "include" or any other variation thereof are intended to cover a non-exclusive inclusion, such that a process, a method, an article, or a device that comprises a list of elements include not only these elements but also other elements not expressly listed, or include elements inherent to such process, method, article, or device. Without further limitation, an element defined by the statement "includes an . . . " does not exclude the presence of another identical element in a process, method, article or device that includes the element.

Those skilled in the art will appreciate that the block diagrams presented in this specification represent conceptual diagrams of illustrative circuits that implement the principle of the present disclosure. Similarly, it should be understood that any flow table, flow chart, state transition diagram, pseudo code, etc. represent various processes that can be substantially represented in a computer readable medium and executed by a computer or processor, regardless of whether they are explicitly displayed by such computer or processor. A written computer readable medium and code can be implemented in a transient state (signal) and a non-transient state (e.g., on a tangible medium such as CD-ROM, DVD, Blu-ray, hard disk drive, flash memory card, or other types of tangible storage medium).

The functions of the various elements shown in the figures may be provided by using a dedicated hardware and a hardware capable of executing a software in conjunction with an appropriate software. When provided by a processor, the functions may be provided by a single dedicated processor or a single shared processor or a plurality of independent processors some of which may be shared. Also, the explicit use of the term "processor" or "controller" should not be interpreted as exclusively referring to a hardware capable of executing a software, but may include, without limitation or implicitly, a digital signal processor ("DSP") hardware, a read only memory ("ROM"), a random access memory ("RAM") and a non-volatile memory for storing a software.

Some specific embodiments have been described above. It should be understood that modifications may be made to these embodiments. For example, elements of different embodiments may be combined, supplemented, modified, and deleted to obtain other embodiments. In addition, one of ordinary skill in the art should understand that other structures and processing flows may be used instead of the structures and processing flows already disclosed above to obtain other embodiments. The other embodiments achieve substantially the same functions in at least substantially the same way, and achieve substantially the same effects provided by the embodiments of the present disclosure. Accordingly, these and other embodiments should fall within the scope of the present disclosure.

What is claimed is:

1. A method for operating a target resource on a common service entity, comprising:
   receiving a request for operating a first resource as the target resource;
   retrieving at least one resource correlated with the first resource, the at least one resource includes a second resource; and
   selecting the target resource from the first resource and the at least one resource correlated with the first resource for operation,
   wherein,
   attributes of the first resource include an identifier of the second resource, or
   a member list of a first resource group includes an identifier of the second resource and an identifier of the first resource, and a member list of a second resource group includes an identifier of the second resource and a member list of a first resource group includes an identifier of the first resource and an attribute that directs to an identifier of the second resource group.

2. The method of claim 1, further comprising:
   creating the first resource group, wherein a member list of the first resource group includes the identifier of a first resource, so that the first resource is a member of the created first resource group.

3. The method of claim 2, in a case where the first resource group is created, the member list of the first resource group further includes the identifier of the second resource, so that the second resource is a member of the first resource group.

4. The method of claim 2, further comprising:
   creating the second resource group, wherein a member list of the second resource group includes the identifier of the second resource, so that the second resource is a member of the created second resource group; and
   setting an attribute in the first resource group that directs to an identifier the identifier of the second resource group, so as to correlate the first resource group with the second resource group.

5. The method of claim 1, further comprising:
   setting an attribute in the first resource that directs to the identifier of the second resource.

6. The method of claim 3, further comprising:
   accessing the first resource group or the first resource, and acquiring the second resource correlated with the first resource.

7. The method of claim 6, further comprising:
   selecting the first resource or the second resource as the target resource according to at least one of: update time, update precision, and updated content of data recorded by the first resource and the second resource, and operating the target resource.

8. The method of claim 3, wherein the first resource group includes an attribute of a start time for resource correlation, the method further comprising:
   setting the start time for resource correlation to a time at which the creation of the first resource group is completed.

9. The method of claim 3, wherein the first resource group includes an attribute of a start time for resource correlation and an enable flag for resource correlation, the method further comprises:
   in a case where an update request for the first resource group for establishing a correlation between the first resource and the second resource is received, setting the enable flag for resource correlation to true, and setting the start time for resource correlation to a time at which the update of the first resource group is completed.

10. The method of claim 2, wherein the first resource group includes an attribute of a start time for resource correlation, the method further comprises:
    in a case where an update request for the first resource group for establishing a correlation between the first resource and the second resource is received, adding the identifier of the second resource to the member list of the first resource group so that the second resource is a member of the first resource group, and setting the start time for resource correlation to a time at which the update of the first resource group is completed.

11. The method of claim 4, wherein the first resource group further includes a start time for resource correlation, the method comprises:
    setting the start time for resource correlation to a time at which the setting of the attribute in the first resource group that directs to the identifier of the second resource group is completed.

12. The method of claim 8, wherein the first resource group further includes an attribute of an end time for resource correlation, the method further comprises:
    in a case where an update request for the first resource group for releasing the correlation between the first resource and the second resource is received, setting the end time for resource correlation to a time at which the update of the first resource group is completed.

13. The method of claim 5, wherein the first resource includes a start time for resource correlation, the method further comprises:
    setting the start time for resource correlation to a time at which when the setting of the attribute in the first resource group that directs to the identifier of the second resource is completed.

14. The method of claim 13, wherein the first resource further includes an end time for resource correlation, the method further comprises:
    in a case where an update request for the first resource for releasing the correlation between the first resource and the second resource is received, setting the end time for resource correlation to a time at which the update of the first resource is completed.

15. The method of claim 4, wherein in addition to the second resource, the member list of the second resource group further includes at least one member correlated with the second resource;
the method further comprises:
selecting one or more members listed in the member list of the second resource group as the target resource for operation.

16. The method of claim 2, further comprising:
selecting one or more members listed in the member list of the first resource group as the target resource for operation.

17. The method of claim 4, further comprising:
determining one or more resources correlated with the first resource as the target resource for operation according to at least one of: update time, update precision and updated content of data recorded by members listed in the member lists of the first resource group and the second resource group.

18. A node device comprises a processor, wherein the processor is configured to perform the steps of the method according to claim 1.

19. A terminal apparatus for operating a target resource, comprising a processor, wherein the processor is configured to:
transmit, to the node device of claim 18, a request for operating a first resource as the target resource; and
receive, from the node device, a response result of operating at least one resource correlated with the first resource.

20. The terminal apparatus of claim 19, wherein the first resource and the at least one resource correlated therewith are members of a first resource group; or
wherein the first resource and the at least one resource correlated therewith are a member of the first resource group and a member of the second resource group, respectively, and the first resource group including an attribute that directs to the identifier of the second resource group; or
wherein the first resource includes an attribute that directs to the identifier of the at least one resource.

* * * * *